(12) United States Patent
Abedini et al.

(10) Patent No.: US 11,856,418 B2
(45) Date of Patent: Dec. 26, 2023

(54) TECHNIQUES FOR DOWNLINK FORWARDING IN WIRELESS COMMUNICATIONS SYSTEMS

(71) Applicant: QUALCOMM Incorporated, San Diego, CA (US)

(72) Inventors: Navid Abedini, Basking Ridge, NJ (US); Muhammad Nazmul Islam, Littleton, MA (US); Ashwin Sampath, Skillman, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/237,356

(22) Filed: Apr. 22, 2021

(65) Prior Publication Data
US 2022/0345910 A1 Oct. 27, 2022

(51) Int. Cl.
*H04W 24/02* (2009.01)
*H04B 7/06* (2006.01)
*H04W 88/14* (2009.01)
*H04W 48/16* (2009.01)

(52) U.S. Cl.
CPC .......... *H04W 24/02* (2013.01); *H04B 7/0626* (2013.01); *H04W 48/16* (2013.01); *H04W 88/14* (2013.01)

(58) Field of Classification Search
CPC ..... H04W 24/02; H04W 48/16; H04W 88/14; H04B 7/0626
See application file for complete search history.

(56) References Cited

U.S. PATENT DOCUMENTS

| | | | | |
|---|---|---|---|---|
| 2008/0247372 | A1* | 10/2008 | Chion | H04W 72/005 370/338 |
| 2008/0320354 | A1* | 12/2008 | Doppler | H04L 1/1893 714/748 |
| 2011/0212685 | A1* | 9/2011 | Nakagawa | H04W 28/06 455/7 |
| 2013/0070661 | A1* | 3/2013 | Nagata | H04W 72/0406 370/329 |
| 2020/0053735 | A1* | 2/2020 | Gupta | H04W 72/04 |
| 2021/0037447 | A1* | 2/2021 | Tarighat Mehrabani | H04W 40/248 |

(Continued)

*Primary Examiner* — Wayne H Cai
(74) *Attorney, Agent, or Firm* — Dalei Dong; Holland & Hart LLP

(57) ABSTRACT

Methods, systems, and devices for wireless communication are described. For example, the described techniques provide for a base station of a wireless communications system to determine a configuration for a repeating device to forward signals to another device. In some examples, the configuration may be based on a number of repeating devices in the wireless communications system. The base station may also transmit a message for the repeating device to forward. In some examples, based on a buffering capability of the repeating device, the base station may transmit the message with a zero time offset relative to the control signaling. The repeating device may receive and process the control signaling and receive and buffer the message. In response to processing the control signaling, the repeating device may transmit the buffered message to another device. Implementing aspects of present disclosure may enable an increased efficiency of forwarding in wireless communications systems.

25 Claims, 20 Drawing Sheets

(56) References Cited

U.S. PATENT DOCUMENTS

| | | | |
|---|---|---|---|
| 2021/0243636 A1* | 8/2021 | Zhuo | H04W 28/02 |
| 2021/0378006 A1* | 12/2021 | Takeda | H04W 52/242 |
| 2022/0369309 A1* | 11/2022 | Li | H04W 72/0453 |

* cited by examiner

TECHNIQUES FOR DOWNLINK FORWARDING IN WIRELESS COMMUNICATIONS SYSTEMS

FIELD OF DISCLOSURE

The following relates to wireless communication, including techniques for downlink forwarding in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may use signal repeating devices (e.g., repeaters) to extend coverage of wireless communications services. Some such systems may use multiple signal repeating devices between devices (e.g., if operating has a multi-hop network). For example, a base station may use multiple repeaters to communicate which a UE. It may be beneficial to implement for downlink forwarding in such wireless communications systems.

SUMMARY

The described techniques relate to improved methods, systems, devices, and apparatuses that support techniques for downlink forwarding in wireless communications systems. For example, the described techniques provide for a base station of a wireless communications system to determine a configuration for a repeating device to forward signals to another device (e.g., another repeating device or a user equipment (UE)). In some examples, the configuration may be based on a number of repeating devices in the wireless communications system. If there are multiple repeating devices, the base station may transmit control signaling indicating configurations for each repeating device. The base station may also transmit a message for the repeating device to forward. In some examples, based on a buffering capability of the repeating device, the base station may transmit the message with a zero time offset relative to the control signaling. Accordingly, the repeating device may receive and process the control signaling and receive and buffer the message. In response to processing the control signaling, the repeating device may transmit the buffered message to another device. Implementing aspects of present disclosure may allow for an increased efficiency of downlink forwarding in wireless communications systems, including multi-hop systems.

A method for wireless communication at a first device is described. The method may include receiving control signaling from a second device within a first time period, the control signaling indicating a configuration for forwarding messages to a third device based on the first device including a first repeater, receiving a message from the second device within a second time period, the second time period being different from the first time period, buffering the message in response to receiving the message from the second device and based on the configuration for forwarding messages to the third device, and transmitting the buffered message to the third device based on the configuration for forwarding messages to the third device.

An apparatus for wireless communication at a first device is described. The apparatus may include a processor, memory coupled with the processor, and instructions stored in the memory. The instructions may be executable by the processor to cause the apparatus to receive control signaling from a second device within a first time period, the control signaling indicating a configuration for forwarding messages to a third device based on the first device including a first repeater, receive a message from the second device within a second time period, the second time period being different from the first time period, buffering the message in response to receive the message from the second device and based on the configuration for forwarding messages to the third device, and transmit the buffered message to the third device based on the configuration for forwarding messages to the third device.

Another apparatus for wireless communication at a first device is described. The apparatus may include means for receiving control signaling from a second device within a first time period, the control signaling indicating a configuration for forwarding messages to a third device based on the first device including a first repeater, means for receiving a message from the second device within a second time period, the second time period being different from the first time period, means for buffering the message in response to receiving the message from the second device and based on the configuration for forwarding messages to the third device, and means for transmitting the buffered message to the third device based on the configuration for forwarding messages to the third device.

A non-transitory computer-readable medium storing code for wireless communication at a first device is described. The code may include instructions executable by a processor to receive control signaling from a second device within a first time period, the control signaling indicating a configuration for forwarding messages to a third device based on the first device including a first repeater, receive a message from the second device within a second time period, the second time period being different from the first time period, buffering the message in response to receive the message from the second device and based on the configuration for forwarding messages to the third device, and transmit the buffered message to the third device based on the configuration for forwarding messages to the third device.

Some examples of the method, apparatuses, and non-transitory computer-readable medium described herein may further include operations, features, means, or instructions for decoding the control signaling within the second time period, where buffering the message from the second device may be based on the decoding.

Some examples of the method, apparatuses, and non-transitory computer-readable medium described herein may further include operations, features, means, or instructions for receiving the control signaling includes receiving the control signaling using a first bandwidth part and receiving the message from the second device includes receiving the message using a second bandwidth part different from the first bandwidth part.

Some examples of the method, apparatuses, and non-transitory computer-readable medium described herein may further include operations, features, means, or instructions for receiving an indication of the second bandwidth part from the second device, where receiving the message using the second bandwidth part may be based on receiving the indication of the second bandwidth part.

Some examples of the method, apparatuses, and non-transitory computer-readable medium described herein may further include operations, features, means, or instructions for determining a buffering capability of the first device, where receiving the message at the second time period may be based on the buffering capability.

Some examples of the method, apparatuses, and non-transitory computer-readable medium described herein may further include operations, features, means, or instructions for determining that the first device includes a digital repeater, where the buffering capability may be based on the first device including the digital repeater.

Some examples of the method, apparatuses, and non-transitory computer-readable medium described herein may further include operations, features, means, or instructions for transmitting, to the second device, an indication of a buffering capability of the first device, where receiving the control signaling may be in response to transmitting the indication.

Some examples of the method, apparatuses, and non-transitory computer-readable medium described herein may further include operations, features, means, or instructions for receiving an indication that the first device may be to buffer the message from the second device, where the control signaling includes the indication.

Some examples of the method, apparatuses, and non-transitory computer-readable medium described herein may further include operations, features, means, or instructions for determining a set of digital samples associated with the message received from the second device, where buffering the message includes buffering the set of digital samples.

Some examples of the method, apparatuses, and non-transitory computer-readable medium described herein may further include operations, features, means, or instructions for extracting the message from a buffer, where transmitting the buffered message to the third device may be based on the extracting.

In some examples of the method, apparatuses, and non-transitory computer-readable medium described herein, the control signaling includes first control signaling and the method, apparatuses, and non-transitory computer-readable medium may include further operations, features, means, or instructions for receiving second control signaling from the second device within a third time period, the second control signaling indicating a configuration for forwarding messages to a fourth device based on the third device including a second repeater, buffering the second control signaling in response to receiving the control signaling from the second device at the third time period, and transmitting the second control signaling to the third device.

Some examples of the method, apparatuses, and non-transitory computer-readable medium described herein may further include operations, features, means, or instructions for receiving a configuration for forwarding feedback messages to the second device, where the control signaling includes the configuration, receiving a feedback message from the third device in response to transmitting the buffered message to the third device, and transmitting the feedback message to the second device.

In some examples of the method, apparatuses, and non-transitory computer-readable medium described herein, the first time period and the second time period may be associated with a same slot and a time offset between the first time period and the second time period may be equal to zero.

In some examples of the method, apparatuses, and non-transitory computer-readable medium described herein, the control signaling includes a front haul physical downlink control channel transmission.

A method for wireless communication at a first device is described. The method may include transmitting control signaling to a second device within a first time period, the control signaling indicating a configuration for forwarding messages to a third device based on the second device including a first repeater and transmitting a message to the second device within a second time period, the second time period associated with a same slot as the first time period.

An apparatus for wireless communication at a first device is described. The apparatus may include a processor, memory coupled with the processor, and instructions stored in the memory. The instructions may be executable by the processor to cause the apparatus to transmit control signaling to a second device within a first time period, the control signaling indicating a configuration for forwarding messages to a third device based on the second device including a first repeater and transmit a message to the second device within a second time period, the second time period associated with a same slot as the first time period.

Another apparatus for wireless communication at a first device is described. The apparatus may include means for transmitting control signaling to a second device within a first time period, the control signaling indicating a configuration for forwarding messages to a third device based on the second device including a first repeater and means for transmitting a message to the second device within a second time period, the second time period associated with a same slot as the first time period.

A non-transitory computer-readable medium storing code for wireless communication at a first device is described. The code may include instructions executable by a processor to transmit control signaling to a second device within a first time period, the control signaling indicating a configuration for forwarding messages to a third device based on the second device including a first repeater and transmit a message to the second device within a second time period, the second time period associated with a same slot as the first time period.

Some examples of the method, apparatuses, and non-transitory computer-readable medium described herein may further include operations, features, means, or instructions for transmitting the control signaling includes transmitting the control signaling using a first bandwidth part and transmitting the message to the second device includes transmitting the message using a second bandwidth part different from the first bandwidth part.

Some examples of the method, apparatuses, and non-transitory computer-readable medium described herein may further include operations, features, means, or instructions for transmitting an indication of the second bandwidth part to the second device, where transmitting the message using the second bandwidth part may be based on transmitting the indication of the second bandwidth part.

Some examples of the method, apparatuses, and non-transitory computer-readable medium described herein may further include operations, features, means, or instructions for determining a buffering capability of the second device, where transmitting the message within the second time period may be based on the buffering capability.

Some examples of the method, apparatuses, and non-transitory computer-readable medium described herein may further include operations, features, means, or instructions for determining that the second device includes a digital repeater, where the buffering capability may be based on the second device including the digital repeater.

Some examples of the method, apparatuses, and non-transitory computer-readable medium described herein may further include operations, features, means, or instructions for receiving, from the second device, an indication of the buffering capability of the second device, where transmitting the control signaling may be in response to receiving the indication.

Some examples of the method, apparatuses, and non-transitory computer-readable medium described herein may further include operations, features, means, or instructions for transmitting an indication that the second device may be to buffer the message from the first device, where the control signaling includes the indication.

Some examples of the method, apparatuses, and non-transitory computer-readable medium described herein may further include operations, features, means, or instructions for transmitting second control signaling to the second device within a third time period, the second control signaling indicating a configuration for forwarding messages to a fourth device based on the third device including a second repeater.

Some examples of the method, apparatuses, and non-transitory computer-readable medium described herein may further include operations, features, means, or instructions for transmitting a configuration for forwarding feedback messages to the first device, where the control signaling includes the configuration and receiving a feedback message from the second device in response to transmitting the message to the second device.

In some examples of the method, apparatuses, and non-transitory computer-readable medium described herein, the control signaling includes a front haul physical downlink control channel transmission.

In some examples of the method, apparatuses, and non-transitory computer-readable medium described herein, the first device includes a repeater and the first device includes a base station.

A method for wireless communication at a first device is described. The method may include receiving a message from a second device according to a configuration for forwarding messages and a timing offset, the second device including a repeater, where the timing offset is based on a buffering capability of the second device and transmitting a feedback message to the second device according to the configuration for forwarding messages.

An apparatus for wireless communication at a first device is described. The apparatus may include a processor, memory coupled with the processor, and instructions stored in the memory. The instructions may be executable by the processor to cause the apparatus to receive a message from a second device according to a configuration for forwarding messages and a timing offset, the second device including a repeater, where the timing offset is based on a buffering capability of the second device and transmit a feedback message to the second device according to the configuration for forwarding messages.

Another apparatus for wireless communication at a first device is described. The apparatus may include means for receiving a message from a second device according to a configuration for forwarding messages and a timing offset, the second device including a repeater, where the timing offset is based on a buffering capability of the second device and means for transmitting a feedback message to the second device according to the configuration for forwarding messages.

A non-transitory computer-readable medium storing code for wireless communication at a first device is described. The code may include instructions executable by a processor to receive a message from a second device according to a configuration for forwarding messages and a timing offset, the second device including a repeater, where the timing offset is based on a buffering capability of the second device and transmit a feedback message to the second device according to the configuration for forwarding messages.

A method for wireless communication at a first device is described. The method may include determining a first configuration for forwarding messages to a third device and a second configuration for forwarding messages to a fourth device, the first configuration and the second configuration based on a number of devices in a wireless network, transmitting first control signaling to a second device indicating the first configuration for forwarding messages to the third device, transmitting second control signaling to the second device, the control signaling indicating the second configuration for forwarding messages to the third device, and transmitting a message to the second device.

An apparatus for wireless communication at a first device is described. The apparatus may include a processor, memory coupled with the processor, and instructions stored in the memory. The instructions may be executable by the processor to cause the apparatus to determine a first configuration for forwarding messages to a third device and a second configuration for forwarding messages to a fourth device, the first configuration and the second configuration based on a number of devices in a wireless network, transmit first control signaling to a second device indicating the first configuration for forwarding messages to the third device, transmit second control signaling to the second device, the control signaling indicating the second configuration for forwarding messages to the third device, and transmit a message to the second device.

Another apparatus for wireless communication at a first device is described. The apparatus may include means for determining a first configuration for forwarding messages to a third device and a second configuration for forwarding messages to a fourth device, the first configuration and the second configuration based on a number of devices in a wireless network, means for transmitting first control signaling to a second device indicating the first configuration for forwarding messages to the third device, means for transmitting second control signaling to the second device, the control signaling indicating the second configuration for forwarding messages to the third device, and means for transmitting a message to the second device.

A non-transitory computer-readable medium storing code for wireless communication at a first device is described. The code may include instructions executable by a processor to determine a first configuration for forwarding messages to a third device and a second configuration for forwarding messages to a fourth device, the first configuration and the second configuration based on a number of devices in a wireless network, transmit first control signaling to a second device indicating the first configuration for forwarding messages to the third device, transmit second control signaling to the second device, the control signaling indicating the second configuration for forwarding messages to the third device, and transmit a message to the second device.

In some examples of the method, apparatuses, and non-transitory computer-readable medium described herein, determining the first configuration and the second configuration may include operations, features, means, or instructions for determining a set of timing parameters associated with forwarding messages to the third device and the fourth device based on the number of devices in the wireless network, where the first configuration and the second configuration include the set of timing parameters.

In some examples of the method, apparatuses, and non-transitory computer-readable medium described herein, the control signaling includes a front haul physical downlink control channel transmission.

In some examples of the method, apparatuses, and non-transitory computer-readable medium described herein, the second device includes a first repeater and the third device includes a second repeater.

DETAILED DESCRIPTION

Figure 1:
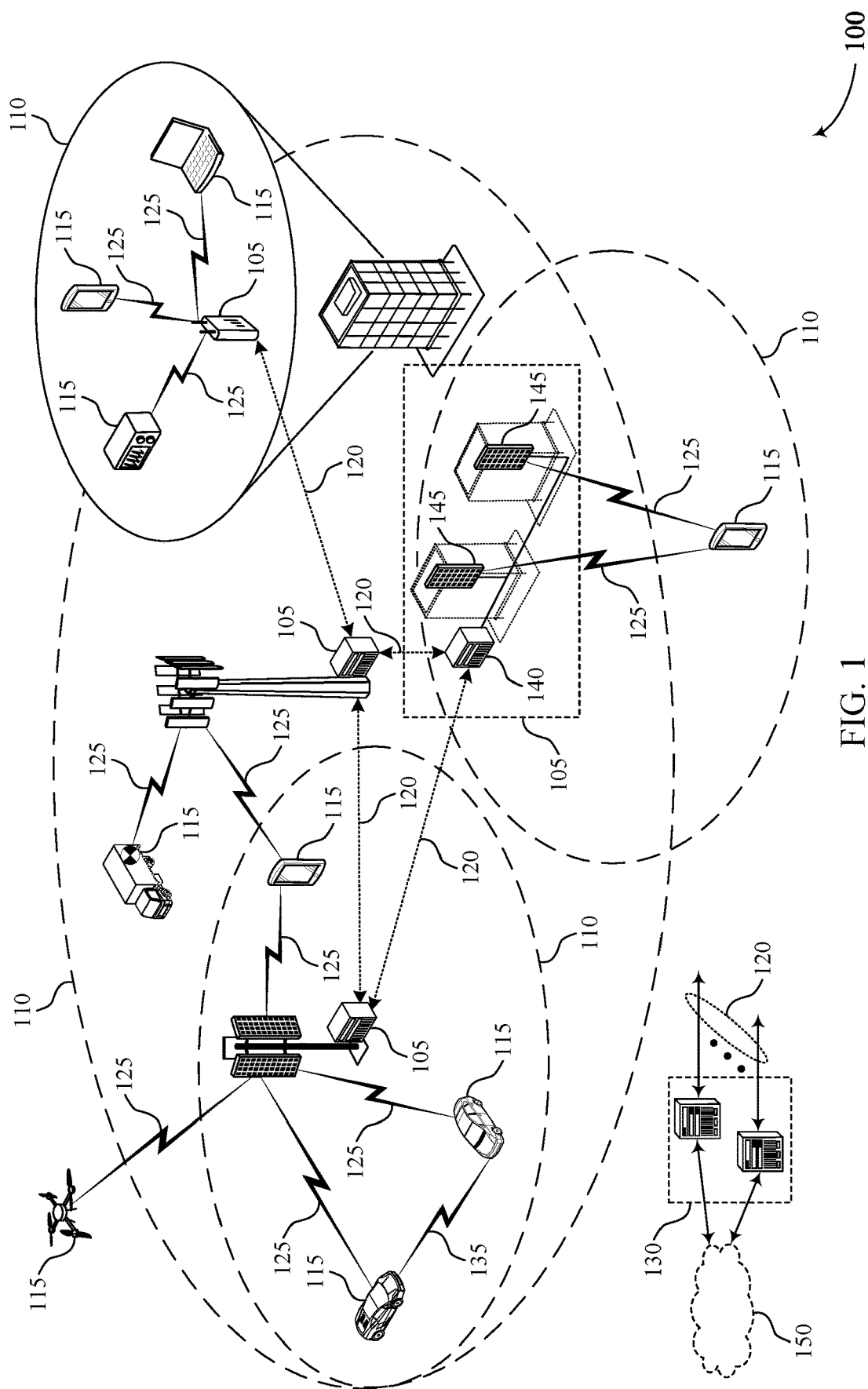
FIG. 1 illustrates an example of a wireless communications system that supports techniques for downlink forwarding in wireless communications systems in accordance with aspects of the present disclosure.

Some wireless communication systems, such as fifth generation (5G) New Radio (NR) systems, may support using signal repeating devices (e.g., repeaters) to extend coverage of wireless communications services. For example, a base station may transmit or receive signaling via a repeating device which may enable the base station to share information with a user equipment (UE) operating outside of a coverage area for the base station. In some implementations, the base station may transmit control signaling (e.g., using physical downlink control channel (PDCCH) or a front-haul PDCCH (FH-PDCCH)) to a repeating device indicating a configuration for forwarding messages. Subsequently, the base station may transmit signaling for the repeating device to forward based on the configuration. In some cases, delays or timing offsets between transmitting control signaling and transmitting messages may be based on a type of the repeating device.

Some repeating devices may operate as analog repeaters such that the repeating devices may regenerate a received analog signal and transmit the regenerated signal to another device. Analog repeating devices may be capable to forward analog signals with little to no delay. However, if a system is using an analog repeating device, a base station may apply a timing offset between transmitting control signaling and transmitting message the analog repeating device is to forward to allow the analog repeating device time to process the control signaling. In some cases, using analog repeating devices may lead to inefficient communications due to timing offsets applied to the system. Some wireless communications systems may use multiple repeating devices (e.g., in a multi-hop scheme). For example, there may exist two or more repeating devices between a base station and a UE. In such systems, timing offsets due to using analog repeating devices may increase, leading to a further reduced efficiency. In some examples, a system may use digital repeating devices, which may mitigate effects of timing offsets because digital repeating devices may have a buffering capability. It may be beneficial to implement techniques for forwarding signals in multi-hop communications systems and in systems using repeating devices with buffering capabilities.

One method for using repeating devices with buffering capabilities may include a base station transmitting, during, during a first time period and to a repeating device, control signaling which indicates a configuration for forwarding signals to a UE. During a second time period, the base station may transmit a message (e.g., including a PDCCH or a physical downlink shared channel (PDSCH)) for forwarding. In some examples, there may exist a zero timing offset between the first timing period and the second timing period (e.g., such that the first timing period and the second timing period are in a same slot). If there exists a zero timing offset between the first timing period and the second timing period, the repeating device may buffer the message for forwarding to the UE (e.g., if the repeating device is processing the control signaling during the second time period). For example, the repeater may decode or otherwise determine digital samples of the message and place the digital samples in a buffer while processing the control signaling. In response to processing the control signaling, and according to the configuration received from the base station, the repeater may regenerate or otherwise extract and transmit the buffered message to the UE. In some examples, the repeating device may indicate a buffering capability of the repeating device to the base station such that the base station transmits the control signaling based on the indication.

In some examples, if a wireless communications system is using a multi-hop communications scheme, the base station may transmit additional control signaling for the repeating device to forward to other repeating devices. For example, the base station may transmit a first control signaling to the repeating indicating a configuration for forwarding additional control signaling and messages to other repeating devices. The base station may also transmit a second (e.g., or a third, fourth, etc.) control signaling to the repeating device for the repeating device to forward to other repeating devices. In some implementations, if the repeating device operates as an analog repeating device, the base station may apply a timing offset or delay between each transmission. For example, the base station may transmit the first control signaling in a first slot, the second control signaling in a second slot, and a message for forwarding to a UE in a third slot. In such implementations, repeating devices may each receive or forward control signaling prior to receiving and forwarding messages for the UE.

In some implementations, if a repeating device is operating as a digital repeater, the repeating device may have (e.g., and may indicate to the base station) a buffering capability. In such implementations, the base station may transmit the first control signaling, the second control signaling, and messages for the UE in a same slot. Accordingly, a first repeating device may receive the first control signaling and may buffer the second control signaling and the messages for the UE. In response to processing the first control signaling, the first repeating device may extract the second control signaling and the messages from the buffer and may transmit the second control signaling and the messages to a second repeating device. The second repeating device may receive the second control signaling and the messages and may buffer the messages while processing the second control signaling. The second repeating device may extract and transmit the buffered messages to the UE in response to processing the second control signaling. In some examples, the repeating devices may similarly be used to receive feedback from the UE and forward the feedback to the base station. Implementing various aspects of the present disclosure may lead to an increased efficiency of communications in wireless communication systems using repeating devices.

Aspects of the disclosure are initially described in the context of wireless communications systems. Aspects of the disclosure are further described in the context of communications flows and process flows in wireless communications systems. Aspects of the disclosure are further illustrated by and described with reference to apparatus diagrams, system diagrams, and flowcharts that relate to techniques for downlink forwarding in wireless communications systems.

FIG. 1 illustrates an example of a wireless communications system 100 that supports techniques for downlink forwarding in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some examples of the wireless communications system 100, a slot may further be divided into multiple mini-slots containing one or more symbols. Excluding the cyclic prefix, each symbol period may contain one or more (e.g., $N_f$) sampling periods. The duration of a symbol period may de 100pend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). The region from 300 MHz to 3 GHz may be referred to as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may use signal repeating devices (e.g., repeaters which regenerate and forward signaling) to extend coverage. For example, a base station 105 may communicate with a UE 115 using repeaters if the UE 115 is outside of a coverage 110. It may be beneficial to implement a method for repeating devices to forward signals.

One such method may include a base station 105 transmitting control signaling to a repeating device indicating a configuration for the repeating device to forward signaling to another repeating device or to a UE 115. In some examples, the base station 105 may transmit the control signaling in response to receiving an indication of a buffering capability of the repeating device. In some examples, the configuration (e.g., timing parameters) may be based on a number of repeating devices between the base station 105 and the UE 115. If there are multiple repeating devices, the base station 105 may transmit control signaling for each repeating device. Subsequently, the base station 105 may transmit a message for forwarding to the UE 115.

If the repeating device includes an analog repeater, the base station 105 may transmit the control signaling and the message according to one or more timing offsets (e.g., based on a number of repeaters in the system). If the repeating device includes a digital repeater, the base station 105 may transmit the control signaling and the message according to a zero time offset (e.g., in a same slot). Accordingly, the repeating device may receive and process the control signaling and receive and buffer the message. Based on processing the control signaling, the repeating device may forward the buffered message to the UE 115. Implementing various aspects of the wireless communications system 100 may enable an increased efficiency in systems using signal repeating devices.

Figure 2:
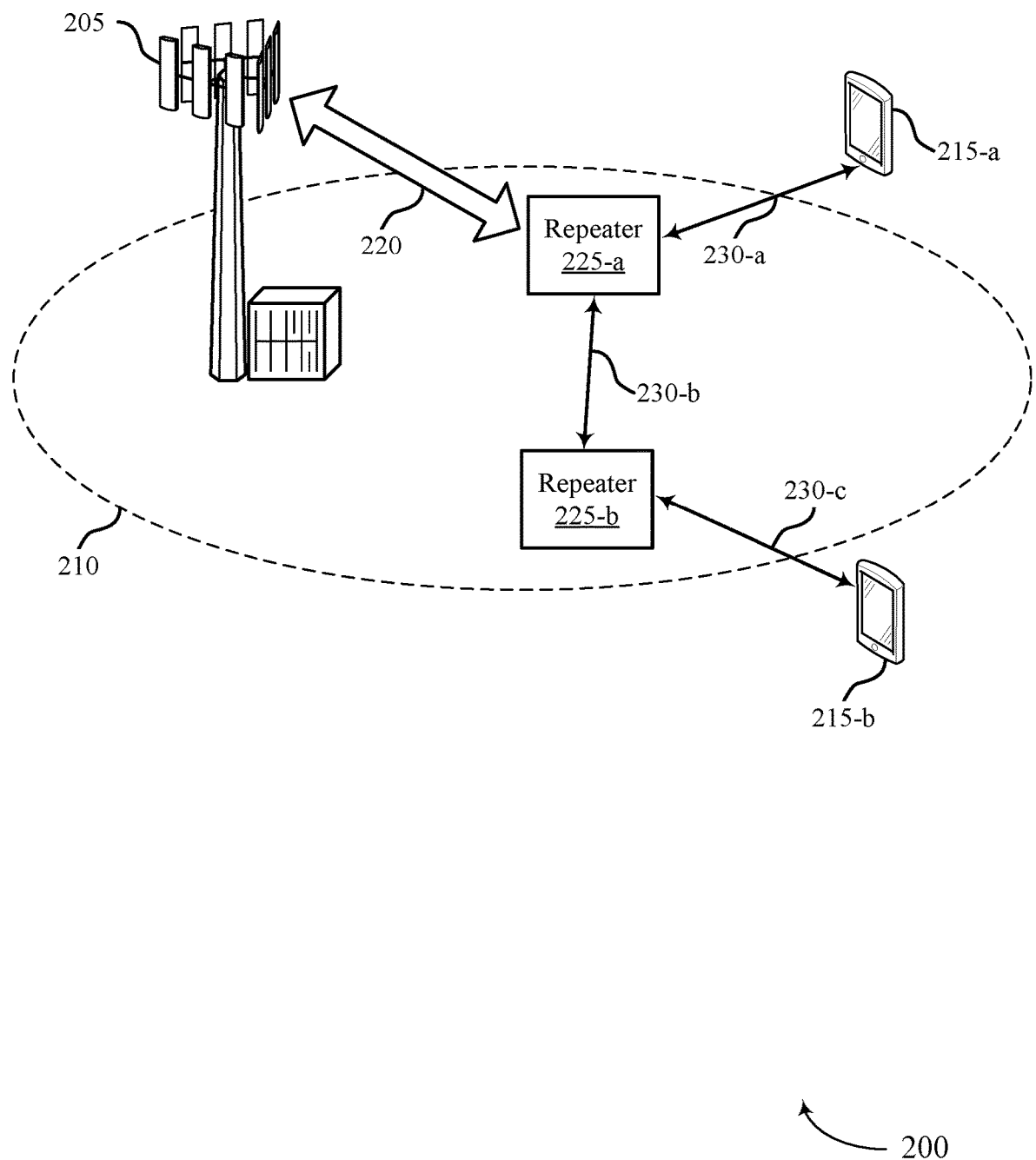
FIG. 2 illustrates an example of a wireless communications system that supports techniques for downlink forwarding in wireless communications systems in accordance with aspects of the present disclosure.

FIG. 2 illustrates an example of a wireless communications system 200 that supports techniques for downlink forwarding in wireless communication systems, in accordance with various aspects of the present disclosure. In some examples, the wireless communications system 200 may implement aspects of a wireless communications system 100, as described with reference to FIG. 1. The wireless communications system 200 may include a UE 215-*a* and a UE 215-*b* which may be examples of a UE 115 as described with reference to FIG. 1. The wireless communications system 200 may also include a base station 205 which may be an example of a base station as described with reference to FIG. 1. The base station 205 may be associated with a cell providing wireless communications services within a coverage area 210.

The UE 215-*a* and the UE 215-*b* may operate outside of the coverage area 210 such that the base station 205 may use the repeater 225-*a* or the repeater 225-*b* to extend coverage and enable communications with the UE 215-*a* and the UE 215-*b*. For example, the base station 205 may transmit signaling to the repeater 225-*a* via a communication link 220 and the repeater 225-*a* may forward the signaling to the UE 215-*a* via a link 230-*a*. In some examples, (e.g., if operating as a multi-hop system) the base station 205 may transmit signaling to the repeater 225-*a* via the communication link 220, the repeater 225-*a* may forward the signaling to the repeater 225-*b* via a link 230-*b*, and the repeater 225-*b* may forward the signaling to the UE 215-*b* via the link 230-*c*.

In some implementations the repeater 225-*a* or the repeater 225-*b* may include a digital repeater. In such implementations, the repeater 225-*a* or the repeater 225-*b* may be capable to buffer signaling. In some examples, the repeater 225-*a* or the repeater 225-*b* may transmit an indication of a buffering capability to the base station 205. Based on a capability of the repeater 225-*a* or the repeater 225-*b* to buffer signaling, the wireless communications system 200 may implement a method whereby the repeater 225-*a* or the repeater 225-*b* may buffer signaling prior to forwarding the signaling. One such method may include the base station 205 transmitting control signaling (e.g., a FH-PDCCH) to the repeater 225-*a* indicating a configuration for the repeater 225-*a* to forward messages to the UE 215-*a*. In some examples, the configuration may include an indication that the repeater 225-*a* is to buffer messages for forwarding to the UE 215-*a*. Subsequent to transmitting the control signaling, the base station 205 may transmit a message to the repeater 225-*a* for forwarding to the UE 215-*a*. Based on the buffering capability of the repeater 225-*a*, the base station 205 may transmit the message with a zero time offset relative to, or in a same slot as, the control signaling (e.g., such that a timing parameter K0 is equal to zero).

The repeater 225-*a* may receive the control signaling and process or decode the control signaling to obtain the configuration for forwarding messages. During a same time as the repeater 225-*a* is processing the control signaling, the repeater 225-*a* may receive and buffer the message (e.g., based on the buffering capability of the repeater 225-*a*). The repeater 225-*a* may receive the message and decode or otherwise process the message to obtain digital samples representative of the message and place the digital samples in a buffer. For example, the repeater 225-*a* may process the message to obtain time or frequency domain in-phase and quadrature (IQ) samples, symbols, codewords, or transport blocks and place the results in a buffer while processing the control signaling received from the base station 205. In some implementations, the repeater 225-*a* may receive the message using a second BWP different from the BWP used for receiving the control signaling. In response to processing the control signaling, the repeater 225-*a* may extract the message from the buffer and transmit the message to the UE 215-*a*. In some examples, the base station 205 may transmit an indication of the second BWP to the repeater 225-*a* (e.g., using semi-static signaling).

If the wireless communications system 200 is operating as a multi-hop system, the base station 205 may use both the repeater 225-*a* and the repeater 225-*b* to communicate with the UE 215-*b*. For example, the base station 205 may transmit first control signaling to the repeater 225-*a* indicating a configuration for the repeater 225-*a* to use for forwarding signals to the repeater 225-*b*. During a same time period (e.g., based on a zero time offset or in a same slot) the base station 205 may transmit second control signaling and a message for forwarding to the UE 215-*b* such that the second control signaling indicates a configuration for the repeater 225-*b* to transmit signaling to the UE 215-*b*. The repeater 225-*a* may buffer the second control signaling and the message for forwarding to the UE 215-*b* if the repeater 225-*a* is processing the first control signaling at a time the repeater 225-*a* receives the second control signaling and the message for forwarding to the UE 215-*b*. Subsequent to processing the first control signaling, the repeater 225-*a* may extract from the buffer and transmit, to the repeater 225-*b*, the second control signaling and the message for forwarding to the UE 215-*b*.

The repeater 225-*b* may receive the second control signaling and the message for forwarding to the UE 215-*b*. Accordingly, the repeater 225-*b* may process the second control signaling and place the message for forwarding to the UE 215-*b* in a buffer. Subsequent to processing the second control signaling, the repeater 225-*b* may extract from the buffer and forward the message to the UE 215-*b*. Implementing various aspects of the present disclosure may lead to a more efficient resource utilization and a reduced signaling overhead.

In some examples, the repeater 225-*a* or the repeater 225-*b* may include an analog repeater. In such examples, the base station 205 may apply timing offsets if transmitting control signaling or messages for forwarding. For example, the base station 205 may transmit, during a first time period, first control signaling to the repeater 225-*a* indicating a configuration for forwarding signaling to the repeater 225-*b*. During a second time period (e.g., after the repeater 225-*a* has had time to process the first control signaling) the base station 205 may transmit second control signaling to the repeater 22-*a* indicating a configuration for the repeater 225-*b* to forward signaling to the UE 215-*b*. The repeater 225-*a* may forward the second control signaling to the repeater 225-*b*. During a third time period, the base station 205 may transmit a message to the repeater 225-*a* for forwarding to the UE 215-*b*. According to the configuration received from the base station 205, the repeater 225-*a* may forward the message to the repeater 225-*b*. The repeater 225-*b* may forward the message to the UE 215-*b*. In some implementations, a timing offset between transmissions may be based on a number of repeaters in a multi-hop system. Implementing various aspects of the wireless communications system 200 may enable transmission of signaling in a multi-hop network.

Figure 3:
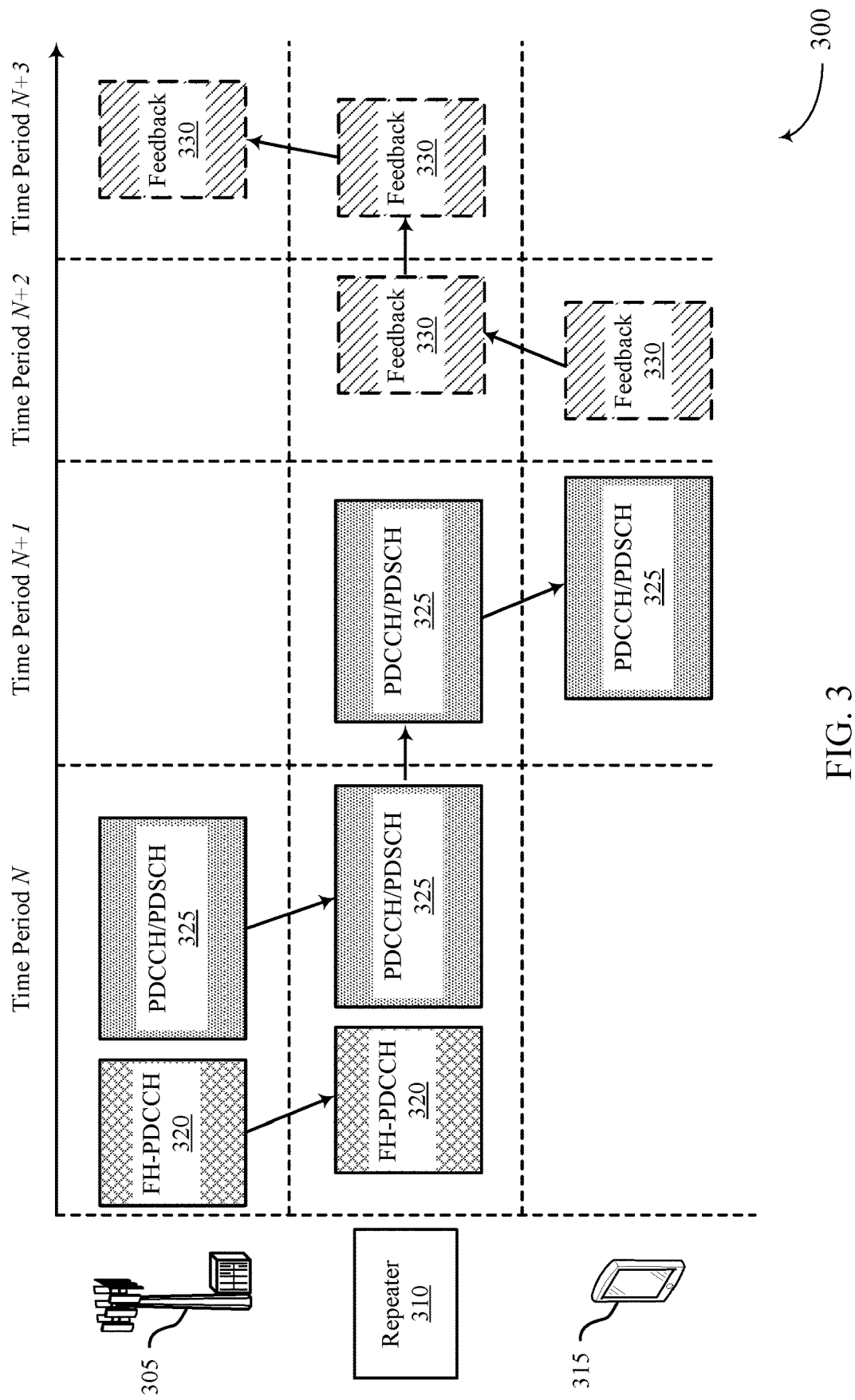
FIG. 3 illustrates an example of a communications flow that supports techniques for downlink forwarding in wireless communications systems in accordance with aspects of the present disclosure.

FIG. 3 illustrates an example of a communications flow 300 in a system that supports techniques for downlink forwarding in wireless communications systems, in accordance with various aspects of the present disclosure. In some examples, the communications flow 300 may be implemented in a wireless communications system 100 or a wireless communications system 200, as described with reference to FIGS. 1 and 2. For example, the communications flow 300 may be implemented by a base station 305, a repeater 310, and a UE 315 which may be examples of the corresponding devices described herein. In some examples, the repeater 310 may include a digital repeater and may be capable to buffer signals accordingly.

According to the communications flow 300 and during a time period N (e.g., a slot N), the base station 305 may transmit control signaling 320 (e.g., a FH-PDCCH) and a message 325 (e.g., a PDCCH or PDSCH) to the repeater 310. The repeater 310 may receive and process the control signaling 320 and may receive and buffer the message 325. During a time period N+1, the repeater 310 may extract the message 325 from the buffer and transmit the message 325 to the UE 315. During a time period N+2, the UE 315 may, in response to receiving the message 325, transmit a feedback message 330 (e.g., an acknowledgement (ACK)/negative acknowledgement (NACK) message) to the repeater 310. Accordingly, during a time period N+3, the repeater may transmit the feedback message 330 to the base station 305. Implementing various aspects of the communications flow 300 may lead to an increased efficiency of resource utilization, a reduced latency, or a reduced signaling overhead, among other benefits.

Figure 4:
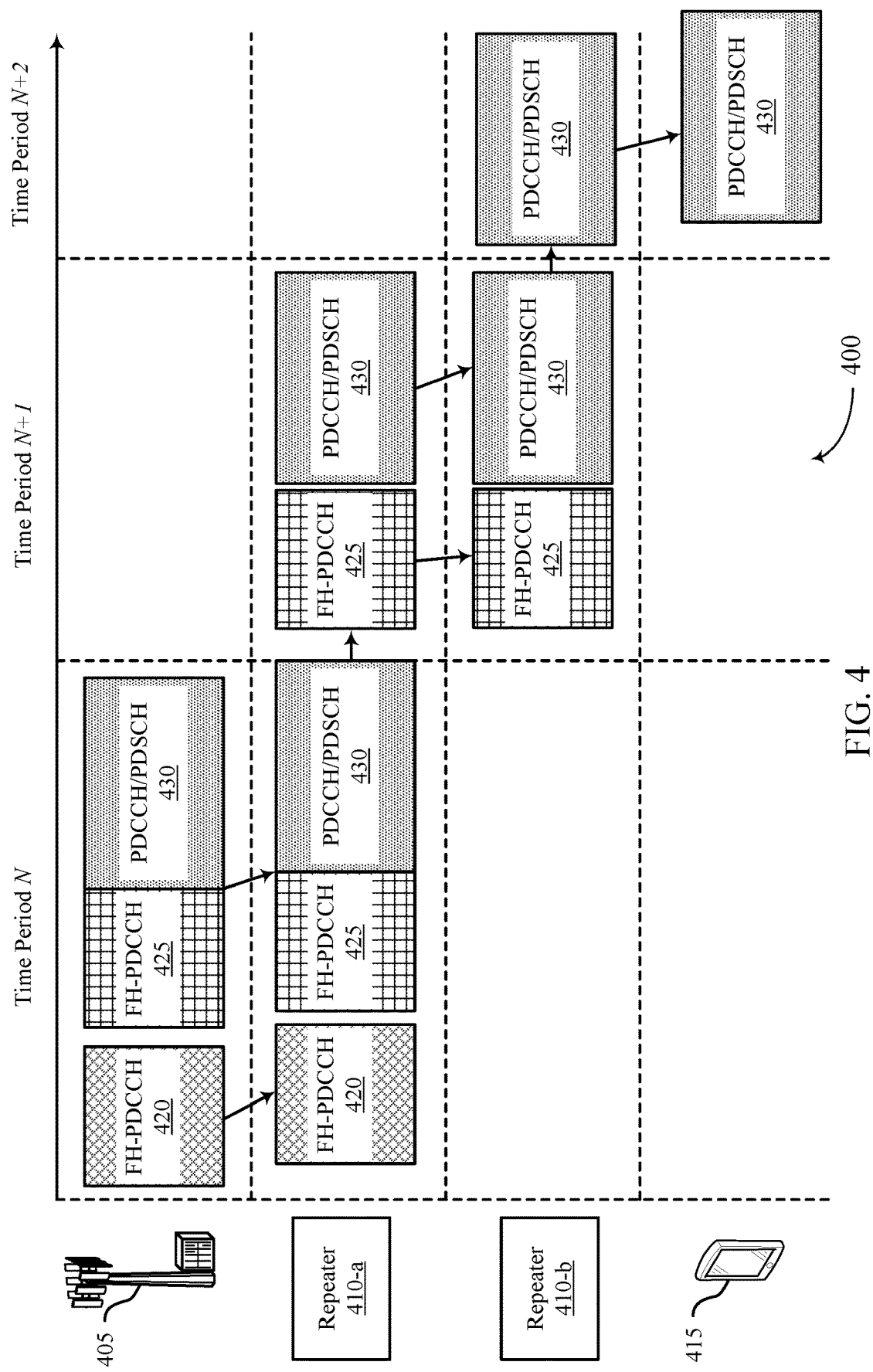
FIG. 4 illustrates an example of a communications flow that supports techniques for downlink forwarding in wireless communications systems in accordance with aspects of the present disclosure.

FIG. 4 illustrates an example of a communications flow 400 in a system that supports techniques for downlink forwarding in wireless communications systems, in accordance with various aspects of the present disclosure. In some examples, the communications flow 400 may be implemented in a wireless communications system 100 or a wireless communications system 200, as described with reference to FIGS. 1 and 2 or may implement aspects of a communications flow 300, as described with reference to FIG. 3. For example, the communications flow 400 may be implemented by a base station 405, a repeater 410-a, a repeater 410-b, and a UE 415 which may be examples of the corresponding devices described herein. In some examples, the repeater 410-a and the repeater 410-b may include digital repeaters and may be capable to buffer signals accordingly.

According to the communications flow 400 and during a time period N (e.g., a slot N), the base station 405 may transmit control signaling 420, control signaling 425, and a message 430 to the repeater 410. In some implementations, the control signaling 420 may indicate a configuration for the repeater 410-a to forward signals to the repeater 410-b and the control signaling 425 may indicate a configuration for the repeater 410-b to forward signals to the UE 415. In some examples, the base station may transmit control signaling 420, control signaling 425, and the message 430 with a zero time offset between transmissions. The repeater 410 may receive and process the control signaling 420 and may receive and buffer the control signaling 425 and the message 430. During a time period N+1, the repeater 410-a may extract the control signaling 425 and the message 430 from the buffer and forward the control signaling 425 and the message 430 to the repeater 410-b. The repeater 410-b may receive and process the control signaling 425 and may receive and buffer the message 430. During a time period N+2, the repeater 410-b may extract the message 430 from the buffer and forward the message 430 to the UE 415. In some implementations, the UE 415 may transmit a feedback message to the repeater 410-b such that a time offset between the control signaling 420 and the feedback message is based on a number of repeaters in the system. In some examples, if the UE 415 transmits a NACK message, the system may perform an end-to-end retransmission of the control signaling 420, the control signaling 425, and the message 430. Implementing various aspects of the communications flow 400 may lead to an increased efficiency of resource utilization, a reduced latency, or a reduced signaling overhead, among other benefits.

Figure 5:
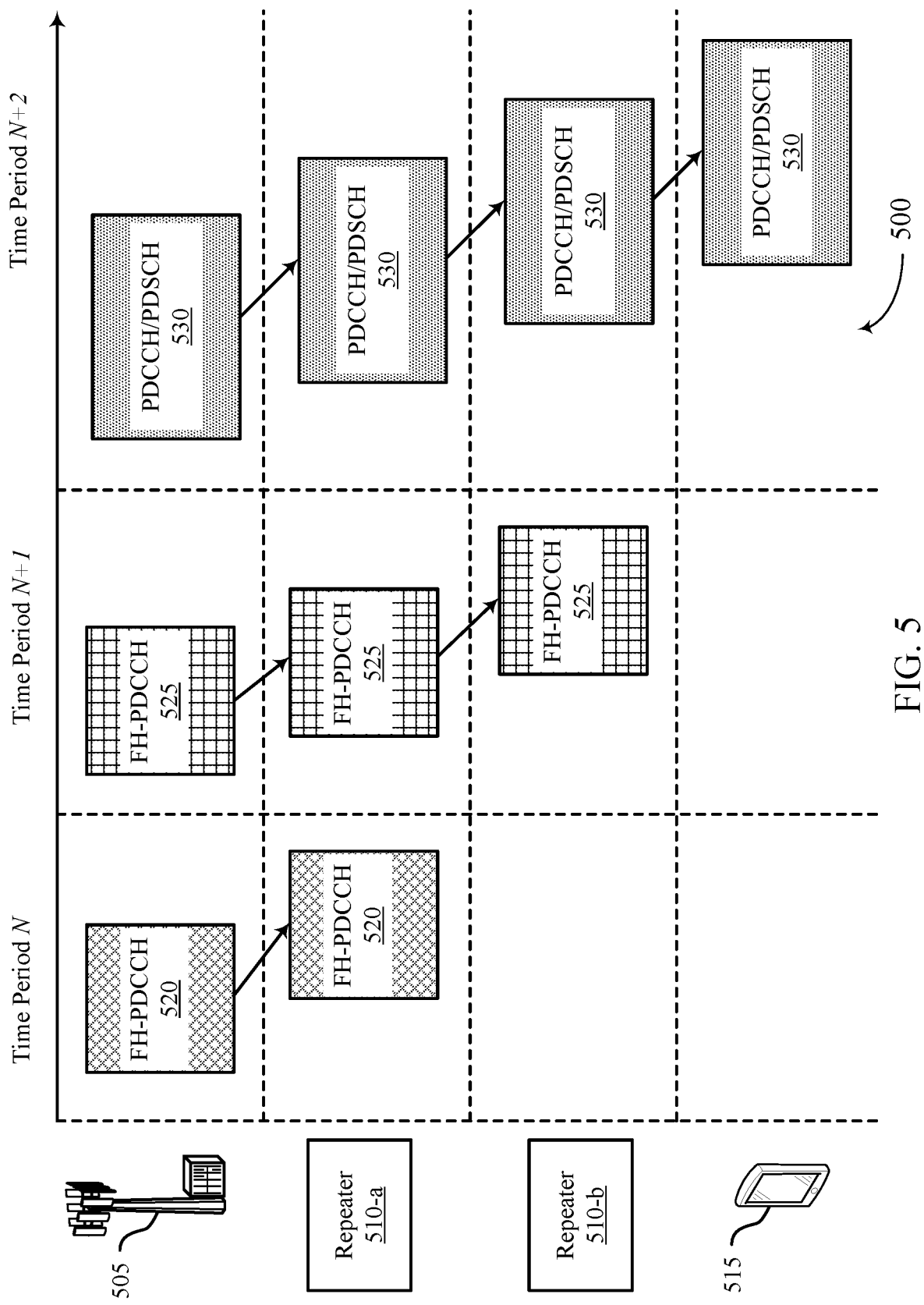
FIG. 5 illustrates an example of a communications flow that supports techniques for downlink forwarding in wireless communications systems in accordance with aspects of the present disclosure.

FIG. 5 illustrates an example of a communications flow 500 in a system that supports techniques for downlink forwarding in wireless communications systems, in accordance with various aspects of the present disclosure. In some examples, the communications flow 500 may be implemented in a wireless communications system 100 or a wireless communications system 200, as described with reference to FIGS. 1 and 2 or may implement aspects of a communications flow 300 or a communications flow 400, as described with reference to FIGS. 3 and 4. For example, the communications flow 400 may be implemented by a base station 505, a repeater 510-a, a repeater 510-b, and a UE 515 which may be examples of the corresponding devices described herein. In some examples, the repeater 510-a and the repeater 510-b may include analog repeaters.

According to the communications flow 500 and during a time period N (e.g., a slot N), the base station 505 may transmit control signaling 520 to the repeater 510-a indicating a configuration for forwarding signals to the repeater 510-b. The repeater 510-a may receive and process the control signaling 520. During a time period N+1 (e.g., after the repeater 510-a has had time to process the control signaling 520), the base station 505 may transmit control signaling 525 to the repeater 510-a indicating a configuration for the repeater 510-b to forward signals to the UE 515. The repeater 510-a may forward the control signaling 525 to the repeater 510-b. During a time period N+2, the base station 505 may transmit a message 530 to the repeater 510-a. The repeater 510-a, according to the configuration indicated using the control signaling 520, may forward the message 530 to the repeater 510-b. Similarly, the repeater 510-b may forward the message 530 to the UE 515. Implementing various aspects of the communications flow 500 may enable transmission of signaling in a multi-hop network.

Figure 6:
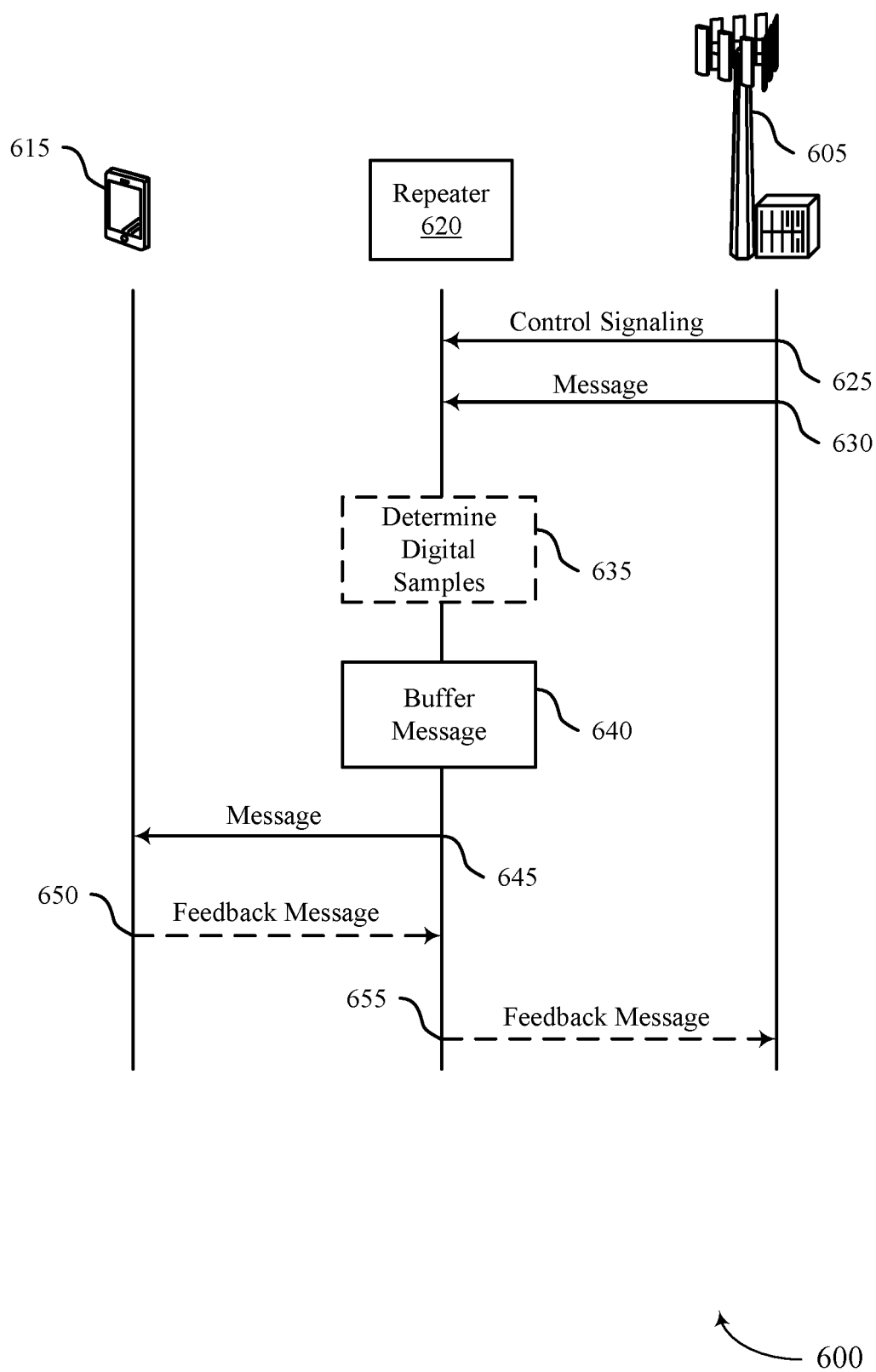
FIG. 6 illustrates an example of a process flow in a system that supports techniques for downlink forwarding in wireless communications systems in accordance with aspects of the present disclosure.

FIG. 6 illustrates an example of process flow 600 in a system that supports techniques for downlink forwarding in wireless communications systems, in accordance with various aspects of the present disclosure. In some examples, the process flow 600 may be implemented in a wireless communications system 100 or a wireless communications system 200, as described with reference to FIGS. 1 and 2. In some examples, the process flow 600 may implement aspects of a communications flow 300, a communications flow 400, or a communications flow 500, as described with reference to FIGS. 3-5. The process flow 600 may include a UE 615, a repeater 620, and a base station 605 which may be examples of the corresponding devices described herein. In some examples, the repeater 620 may include a digital repeater. Alternative examples of the following may be implemented in which some processes are performed in a different order than described or are not performed at all. In some examples, the processes may include additional features not mentioned below, or further processes may be added.

At 625, the base station 605 may transmit control signaling (e.g., a FH-PDCCH) to the repeater 620 indicating a configuration for the repeater 620 to forward signals to the 615. In some examples, the base station 605 may transmit the control signaling in response to receiving, from the repeater 620, an indication of a buffering capability of the repeater 620.

At 630, the base station 605 may transmit a message to the repeater 620 for forwarding to the UE 615. The base station 605 may transmit the message using a zero time offset relative to, or in a same slot as, the control signaling.

At 635, the repeater 620 may, in some implementations, the repeater 620 may determine digital samples of the message received from the base station 605. For example, the repeater 620 may process the message to obtain time or frequency domain in-phase and quadrature (IQ) samples, symbols, codewords, or transport blocks and place the results in a buffer while processing the control signaling received from the base station 605.

At 640, the repeater 620 may buffer the message (e.g., the digital samples of the message) received from the base station 605. For example, the repeater 620 may receive the message during a same time period as the repeater 620 is processing the control signaling and may buffer the message accordingly. At 645, the repeater 620 may forward the buffered message to the UE 615.

At 650, the UE 615 may, in some examples, transmit a feedback message (e.g., an ACK/NACK message) to the repeater 620. At 655, the repeater 620 may forward the feedback message to the base station 605. Implementing aspects of the process flow 600 may lead to an increased resource utilization, an increased efficiency, a reduced latency, or a reduced signaling overhead, among other benefits.

Figure 7:
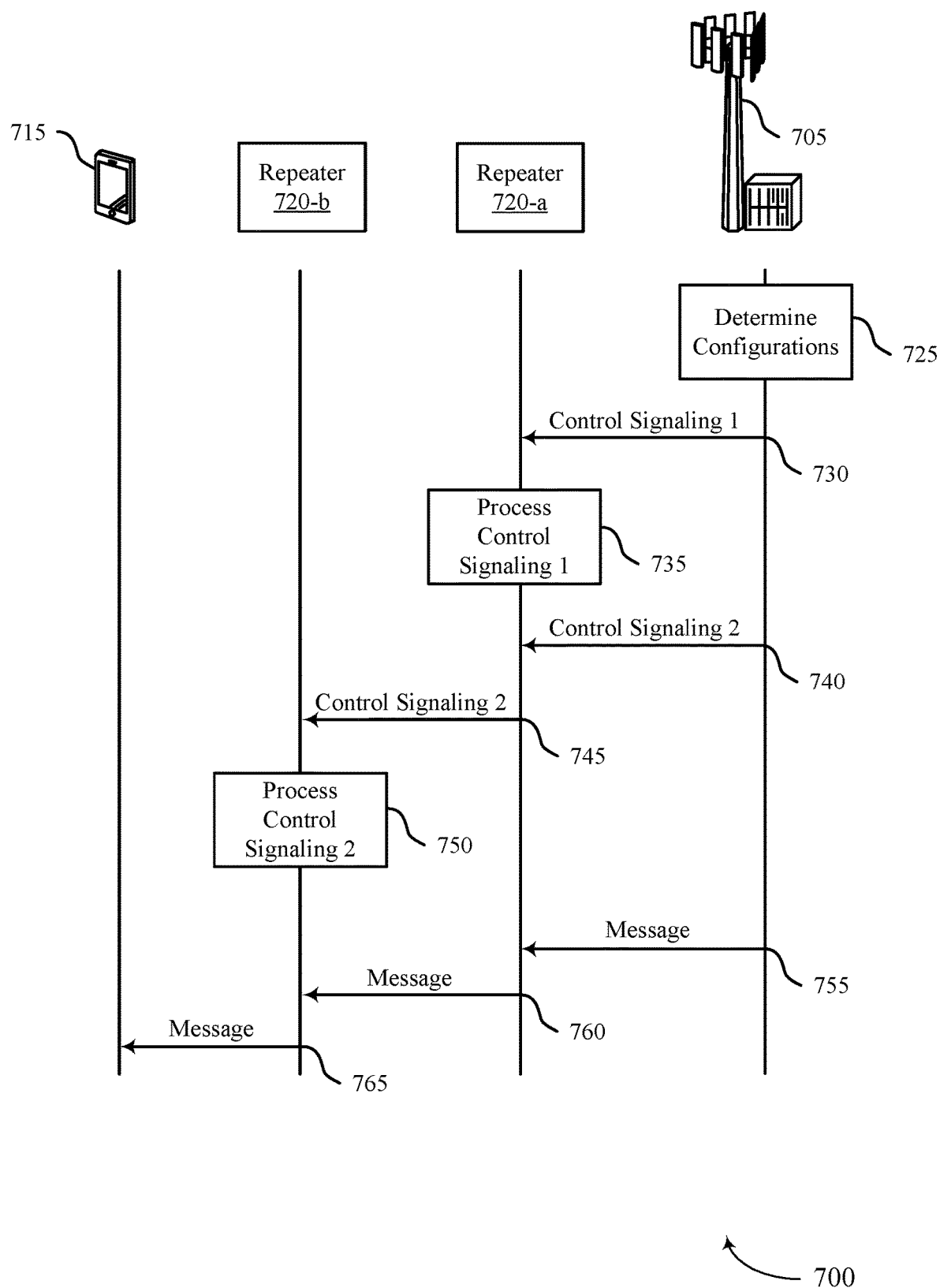
FIG. 7 illustrates an example of a process flow in a system that supports techniques for downlink forwarding in wireless communications systems in accordance with aspects of the present disclosure.

FIG. 7 illustrates an example of process flow 700 in a system that supports techniques for downlink forwarding in wireless communications systems, in accordance with various aspects of the present disclosure. In some examples, the process flow 700 may be implemented in a wireless communications system 100 or a wireless communications system 200, as described with reference to FIGS. 1 and 2. In some examples, the process flow 700 may implement aspects of a communications flow 300, a communications flow 400, a communications flow 500, or a process flow 600, as described with reference to FIGS. 3-6. The process flow 700 may include a UE 715, a repeater 720-*a*, a repeater 720-*b*, and a base station 705 which may be examples of the corresponding devices described herein. In some examples, the repeater 720-*a* and the repeater 720-*b* may include analog repeaters. Alternative examples of the following may be implemented in which some processes are performed in a different order than described or are not performed at all. In some examples, the processes may include additional features not mentioned below, or further processes may be added.

At 725, the base station 705 may determine configurations for forwarding signals in a multi-hop network. For example, the base station 705 may determine a configuration for the repeater 720-*a* to forward signaling to the repeater 720-*b* and a configuration for the repeater 720-*b* to forward signaling to the UE 715. In some implementations, the base station 705 may determine timing parameters (e.g., timing offsets) of the configurations based on a number of repeaters in the multi-hop network.

At 730, the base station 705 may transmit first control signaling to the repeater 720-*a* indicating the configuration for the repeater 720-*a* to forward signals to the repeater 720-*b*. Accordingly, at 735, the repeater 720-*a* may process the first control signaling.

At 740, the base station 705 may transmit, to the repeater 720-*a*, second control signaling to the repeater 720-*a* indicating the configuration for the repeater 720-*b* to forward signaling to the UE 715.

At 745, the repeater 720-*a* may forward the second control signaling to the repeater 720-*b*. Accordingly, at 750, the repeater 720-*b* may process the second control signaling.

At 755, the base station 705 may transmit a message for the UE 715 to the repeater 720-*a*. At 760, the repeater 720-*a* may forward the message to the repeater 720-*b*. Similarly, at 765, the repeater 720-*b* may forward the message to the UE 715. In some examples, a timing offset between the base station 705 transmitting the first control signaling and the base station 705 transmitting the control signaling may be based on a number of repeaters in the system. Implementing aspects of the process flow 700 may enable forwarding of signals in multi-hop wireless communications systems.

Figure 8:
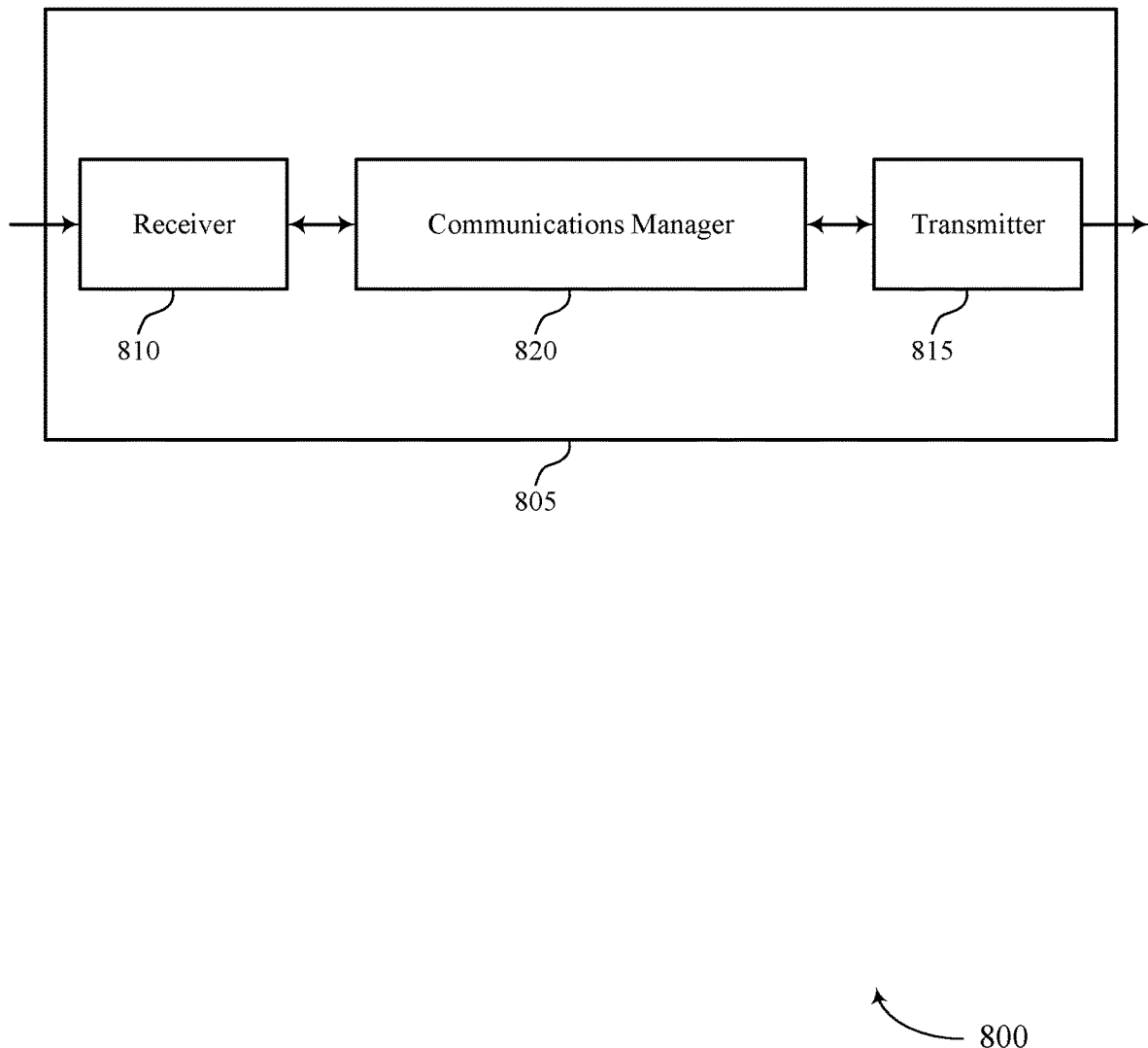
FIGS. 8 and 9 show block diagrams of devices that support techniques for downlink forwarding in wireless communications systems in accordance with aspects of the present disclosure.

FIG. 8 shows a block diagram 800 of a device 805 that supports techniques for downlink forwarding in wireless communications systems in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for downlink forwarding in wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for downlink forwarding in wireless communications systems). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for downlink forwarding in wireless communications systems as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first device in accordance with examples as disclosed herein. For example, the communications manager 820 may be configured as or otherwise support a means for receiving control signaling from a second device within a first time period, the control signaling indicating a configuration for forwarding messages to a third device based on the first device including a first repeater. The communications manager 820 may be configured as or otherwise support a means for receiving a message from the second device within a second time period, the second time period being different from the first time period. The communications manager 820 may be configured as or otherwise support a means for buffering the message in response to receiving the message from the second device and based on the configuration for forwarding messages to the third device. The communications manager 820 may be configured as or otherwise support a means for transmitting the buffered message to the third device based on the configuration for forwarding messages to the third device.

Additionally or alternatively, the communications manager 820 may support wireless communication at a first device in accordance with examples as disclosed herein. For example, the communications manager 820 may be configured as or otherwise support a means for receiving a message from a second device according to a configuration for forwarding messages and a timing offset, the second device including a repeater. The communications manager 820 may be configured as or otherwise support a means for transmitting a feedback message to the second device according to the configuration for forwarding messages.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for downlink forwarding such that the device 805 may exhibit a reduced power consumption, an increased efficiency of communications, an increased efficiency of resource utilization, a reduced latency, or a reduced signaling overhead, among other benefits.

Figure 9:
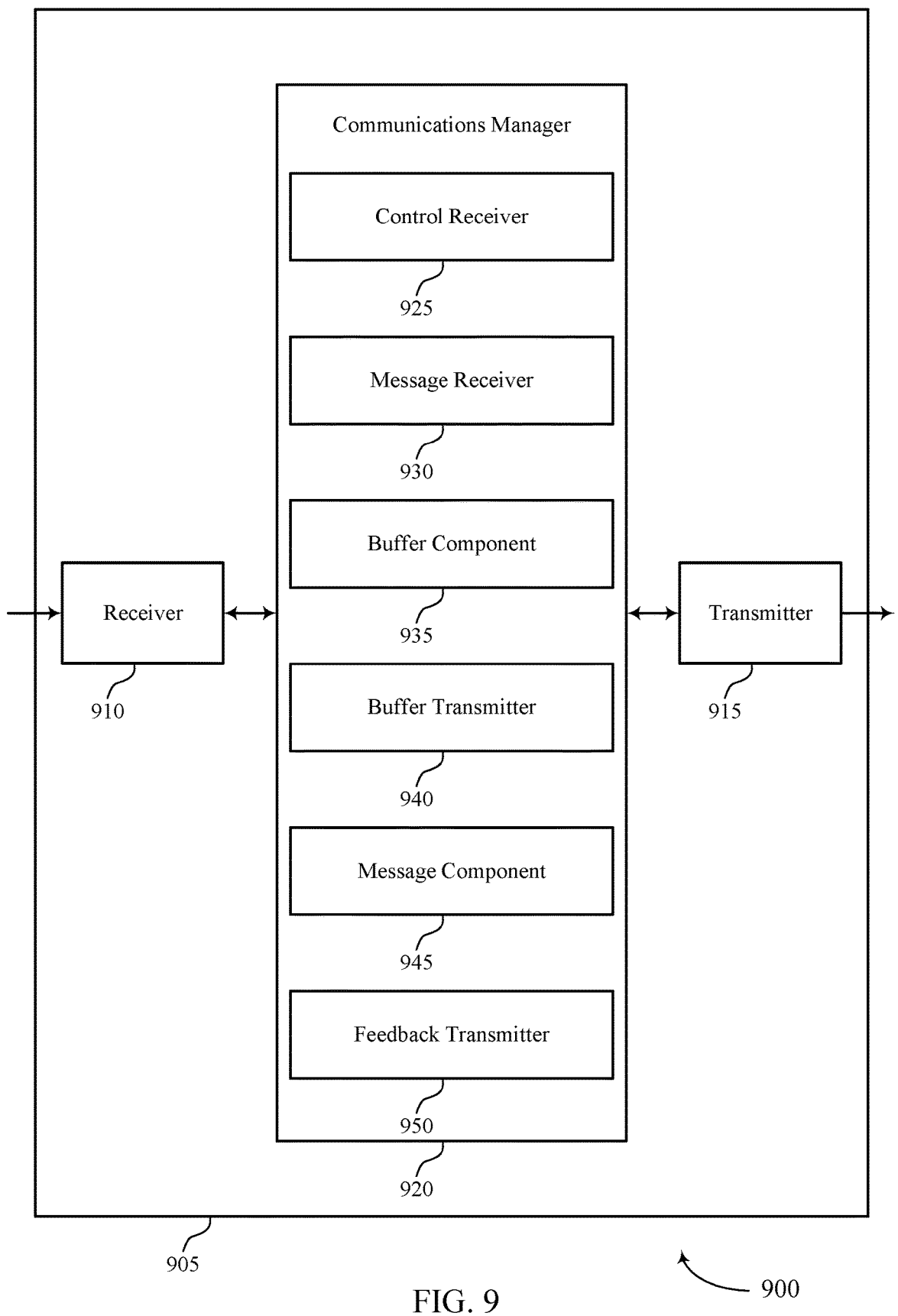

FIG. 9 shows a block diagram 900 of a device 905 that supports techniques for downlink forwarding in wireless communications systems in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for downlink forwarding in wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for downlink forwarding in wireless communications systems). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for downlink forwarding in wireless communications systems as described herein. For example, the communications manager 920 may include a control receiver 925, a message receiver 930, a buffer component 935, a buffer transmitter 940, a message component 945, a feedback transmitter 950, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first device in accordance with examples as disclosed herein. The control receiver 925 may be configured as or otherwise support a means for receiving control signaling from a second device within a first time period, the control signaling indicating a configuration for forwarding messages to a third device based on the first device including a first repeater. The message receiver 930 may be configured as or otherwise support a means for receiving a message from the second device within a second time period, the second time period being different from the first time period. The buffer component 935 may be configured as or otherwise support a means for buffering the message in response to receiving the message from the second device and based on the configuration for forwarding messages to the third device. The buffer transmitter 940 may be configured as or otherwise support a means for transmitting the buffered message to the third device based on the configuration for forwarding messages to the third device.

Additionally or alternatively, the communications manager 920 may support wireless communication at a first device in accordance with examples as disclosed herein. The message component 945 may be configured as or otherwise support a means for receiving a message from a second device according to a configuration for forwarding messages and a timing offset, the second device including a repeater. The feedback transmitter 950 may be configured as or otherwise support a means for transmitting a feedback message to the second device according to the configuration for forwarding messages.

Figure 10:
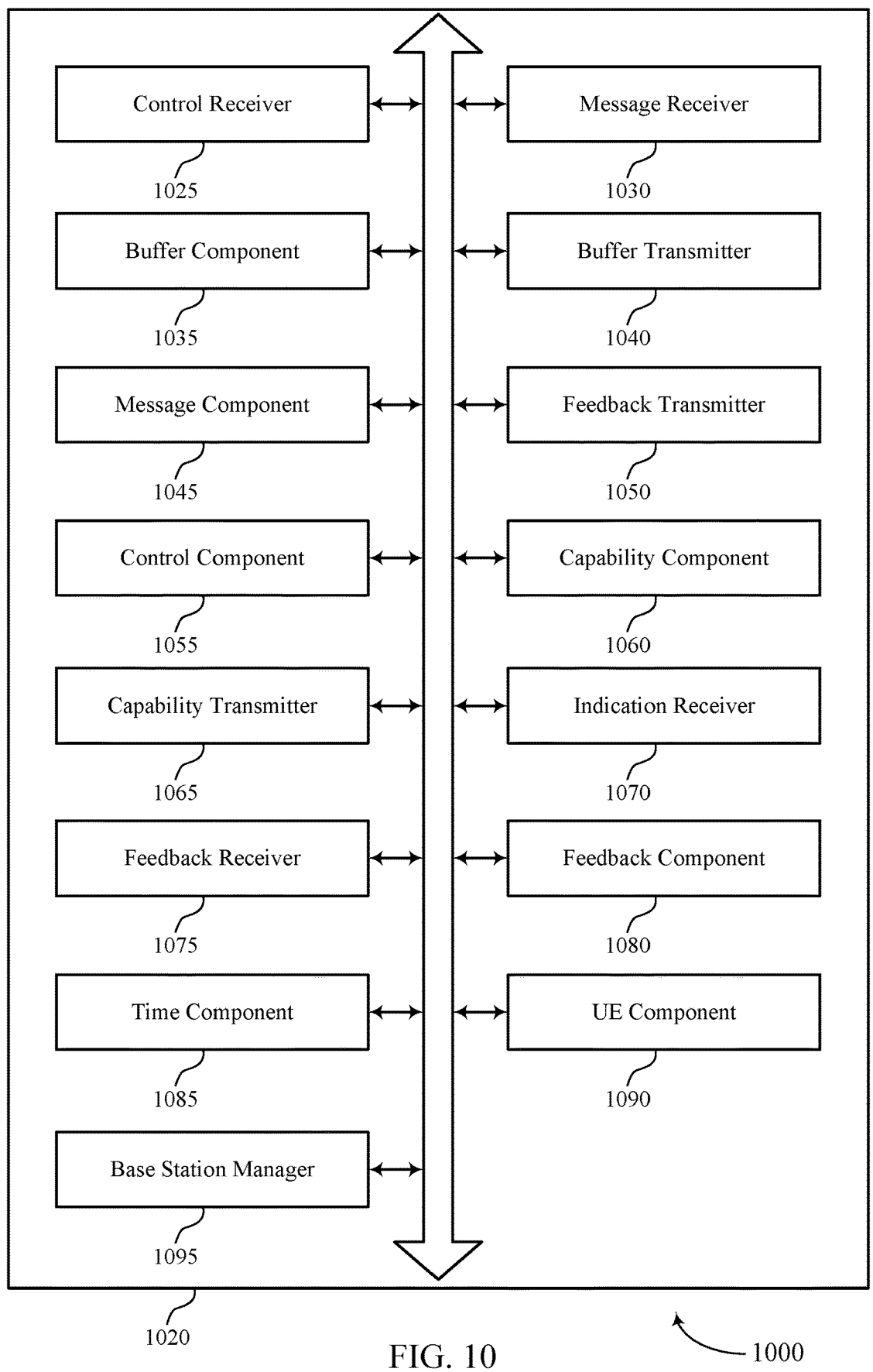
FIG. 10 shows a block diagram of a communications manager that supports techniques for downlink forwarding in wireless communications systems in accordance with aspects of the present disclosure.

FIG. 10 shows a block diagram 1000 of a communications manager 1020 that supports techniques for downlink forwarding in wireless communications systems in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for downlink forwarding in wireless communications systems as described herein. For example, the communications manager 1020 may include a control receiver 1025, a message receiver 1030, a buffer component 1035, a buffer transmitter 1040, a message component 1045, a feedback transmitter 1050, a control component 1055, a capability component 1060, a capability transmitter 1065, an indication receiver 1070, a feedback receiver 1075, a feedback component 1080, a time component 1085, a UE component 1090, a base station manager 1095, or any combination thereof. Each of these components may communicate, directly or indirectly, with one another (e.g., via one or more buses).

The communications manager 1020 may support wireless communication at a first device in accordance with examples as disclosed herein. The control receiver 1025 may be configured as or otherwise support a means for receiving control signaling from a second device within a first time period, the control signaling indicating a configuration for forwarding messages to a third device based on the first device including a first repeater. The message receiver 1030 may be configured as or otherwise support a means for receiving a message from the second device within a second time period, the second time period being different from the first time period. The buffer component 1035 may be configured as or otherwise support a means for buffering the message in response to receiving the message from the second device and based on the configuration for forwarding messages to the third device. The buffer transmitter 1040 may be configured as or otherwise support a means for transmitting the buffered message to the third device based on the configuration for forwarding messages to the third device.

In some examples, the control component 1055 may be configured as or otherwise support a means for decoding the control signaling within the second time period, where buffering the message from the second device is based on the decoding.

In some examples, the control receiver 1025 may be configured as or otherwise support a means for receiving the control signaling includes receiving the control signaling using a first BWP. In some examples, the message receiver 1030 may be configured as or otherwise support a means for receiving the message from the second device includes receiving the using a second BWP different from the first BWP.

In some examples, the capability component 1060 may be configured as or otherwise support a means for determining a buffering capability of the first device, where receiving the message at the second time period is based on the buffering capability.

In some examples, the capability component 1060 may be configured as or otherwise support a means for determining that the first device includes a digital repeater, where the buffering capability is based on the first device including the digital repeater.

In some examples, the capability transmitter 1065 may be configured as or otherwise support a means for transmitting, to the second device, an indication of a buffering capability of the first device, where receiving the control signaling is in response to transmitting the indication.

In some examples, the indication receiver 1070 may be configured as or otherwise support a means for receiving an indication that the first device is to buffer the message from the second device, where the control signaling includes the indication.

In some examples, the buffer component 1035 may be configured as or otherwise support a means for determining a set of digital samples associated with the message received from the second device, where buffering the message includes buffering the set of digital samples.

In some examples, the buffer transmitter 1040 may be configured as or otherwise support a means for extracting the message from a buffer, where transmitting the buffered message to the third device is based on the extracting.

In some examples, the control signaling includes first control signaling, and the control receiver 1025 may be configured as or otherwise support a means for receiving second control signaling from the second device within a third time period, the second control signaling indicating a configuration for forwarding messages to a fourth device based on the third device including a second repeater. In some examples, the control signaling includes first control signaling, and the buffer component 1035 may be configured as or otherwise support a means for buffering the second control signaling in response to receiving the control signaling from the second device at the third time period. In some examples, the control signaling includes first control signaling, and the buffer transmitter 1040 may be configured as or otherwise support a means for transmitting the second control signaling to the third device.

In some examples, the control receiver 1025 may be configured as or otherwise support a means for receiving a configuration for forwarding feedback messages to the second device, where the control signaling includes the configuration. In some examples, the feedback receiver 1075 may be configured as or otherwise support a means for receiving a feedback message from the third device in response to transmitting the buffered message to the third device. In some examples, the feedback component 1080 may be configured as or otherwise support a means for transmitting the feedback message to the second device.

In some examples, the first time period and the second time period are associated with a same slot. In some examples, a time offset between the first time period and the second time period is equal to zero. In some examples, the control signaling includes a FH-PDCCH transmission.

Additionally or alternatively, the communications manager 1020 may support wireless communication at a first device in accordance with examples as disclosed herein. The message component 1045 may be configured as or otherwise support a means for receiving a message from a second device according to a configuration for forwarding messages and a timing offset, the second device including a repeater. The feedback transmitter 1050 may be configured as or otherwise support a means for transmitting a feedback message to the second device according to the configuration for forwarding messages.

In some examples, the first device includes a UE. In some examples, the first device includes a base station.

In some examples, the timing offset is based on a buffering capability of the second device.

Figure 11:
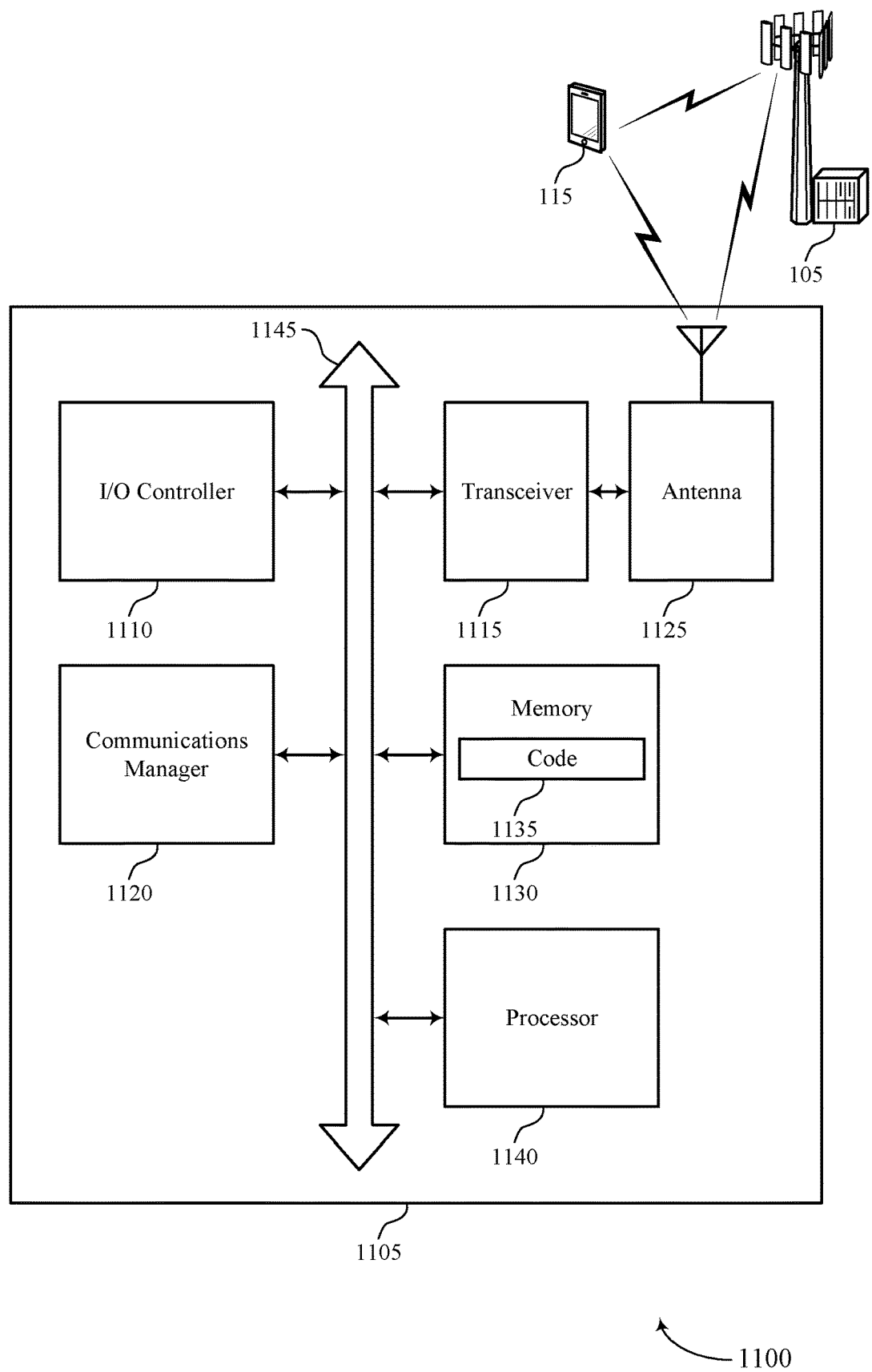
FIG. 11 shows a diagram of a system including a device that supports techniques for downlink forwarding in wireless communications systems in accordance with aspects of the present disclosure.

FIG. 11 shows a diagram of a system 1100 including a device 1105 that supports techniques for downlink forwarding in wireless communications systems in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for downlink forwarding in wireless communications systems). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a first device in accordance with examples as disclosed herein. For example, the communications manager 1120 may be configured as or otherwise support a means for receiving control signaling from a second device within a first time period, the control signaling indicating a configuration for forwarding messages to a third device based on the first device including a first repeater. The communications manager 1120 may be configured as or otherwise support a means for receiving a message from the second device within a second time period, the second time period being different from the first time period. The communications manager 1120 may be configured as or otherwise support a means for buffering the message in response to receiving the message from the second device and based on the configuration for forwarding messages to the third device. The communications manager 1120 may be configured as or otherwise support a means for transmitting the buffered message to the third device based on the configuration for forwarding messages to the third device.

Additionally or alternatively, the communications manager 1120 may support wireless communication at a first device in accordance with examples as disclosed herein. For example, the communications manager 1120 may be configured as or otherwise support a means for receiving a message from a second device according to a configuration for forwarding messages and a timing offset, the second device including a repeater. The communications manager 1120 may be configured as or otherwise support a means for transmitting a feedback message to the second device according to the configuration for forwarding messages.

By including or configuring the communications manager 1120 in accordance with examples as described herein, the device 1105 may support techniques for downlink forwarding such that the device 1105 may exhibit a reduced power consumption, an increased efficiency of communications, an increased efficiency of resource utilization, a reduced latency, or a reduced signaling overhead, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for downlink forwarding in wireless communications systems as described herein, or the processor 1140 and the memory 1130 may be otherwise configured to perform or support such operations.

Figure 12:
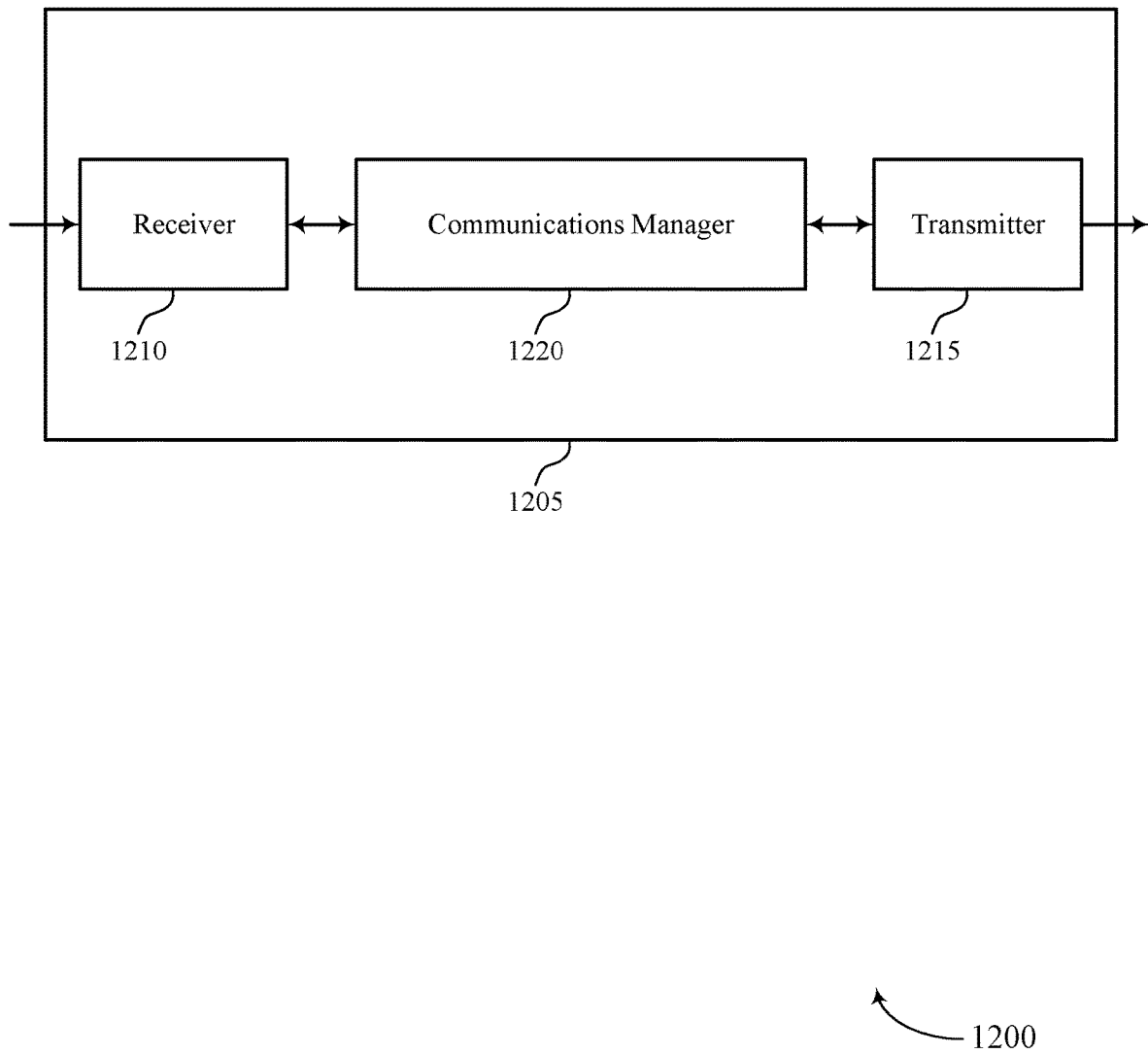
FIGS. 12 and 13 show block diagrams of devices that support techniques for downlink forwarding in wireless communications systems in accordance with aspects of the present disclosure.

FIG. 12 shows a block diagram 1200 of a device 1205 that supports techniques for downlink forwarding in wireless communications systems in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for downlink forwarding in wireless communications systems). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for downlink forwarding in wireless communications systems). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for downlink forwarding in wireless communications systems as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first device in accordance with examples as disclosed herein. For example, the communications manager 1220 may be configured as or otherwise support a means for transmitting control signaling to a second device within a first time period, the control signaling indicating a configuration for forwarding messages to a third device based on the second device including a first repeater. The communications manager 1220 may be configured as or otherwise support a means for transmitting a message to the second device within a second time period, the second time period associated with a same slot as the first time period.

Additionally or alternatively, the communications manager 1220 may support wireless communication at a first device in accordance with examples as disclosed herein. For example, the communications manager 1220 may be configured as or otherwise support a means for determining a first configuration for forwarding messages to a third device and a second configuration for forwarding messages to a fourth device, the first configuration and the second configuration based on a number of devices in a wireless network. The communications manager 1220 may be configured as or otherwise support a means for transmitting first control signaling to a second device indicating the first configuration for forwarding messages to the third device. The communications manager 1220 may be configured as or otherwise support a means for transmitting second control signaling to the second device, the control signaling indicating the second configuration for forwarding messages to the third device. The communications manager 1220 may be configured as or otherwise support a means for transmitting a message to the second device.

By including or configuring the communications manager 1220 in accordance with examples as described herein, the device 1205 (e.g., a processor controlling or otherwise coupled to the receiver 1210, the transmitter 1215, the communications manager 1220, or a combination thereof)

may support techniques for downlink forwarding such that the device 1205 may exhibit a reduced power consumption, an increased efficiency of communications, an increased efficiency of resource utilization, a reduced latency, or a reduced signaling overhead, among other benefits.

Figure 13:
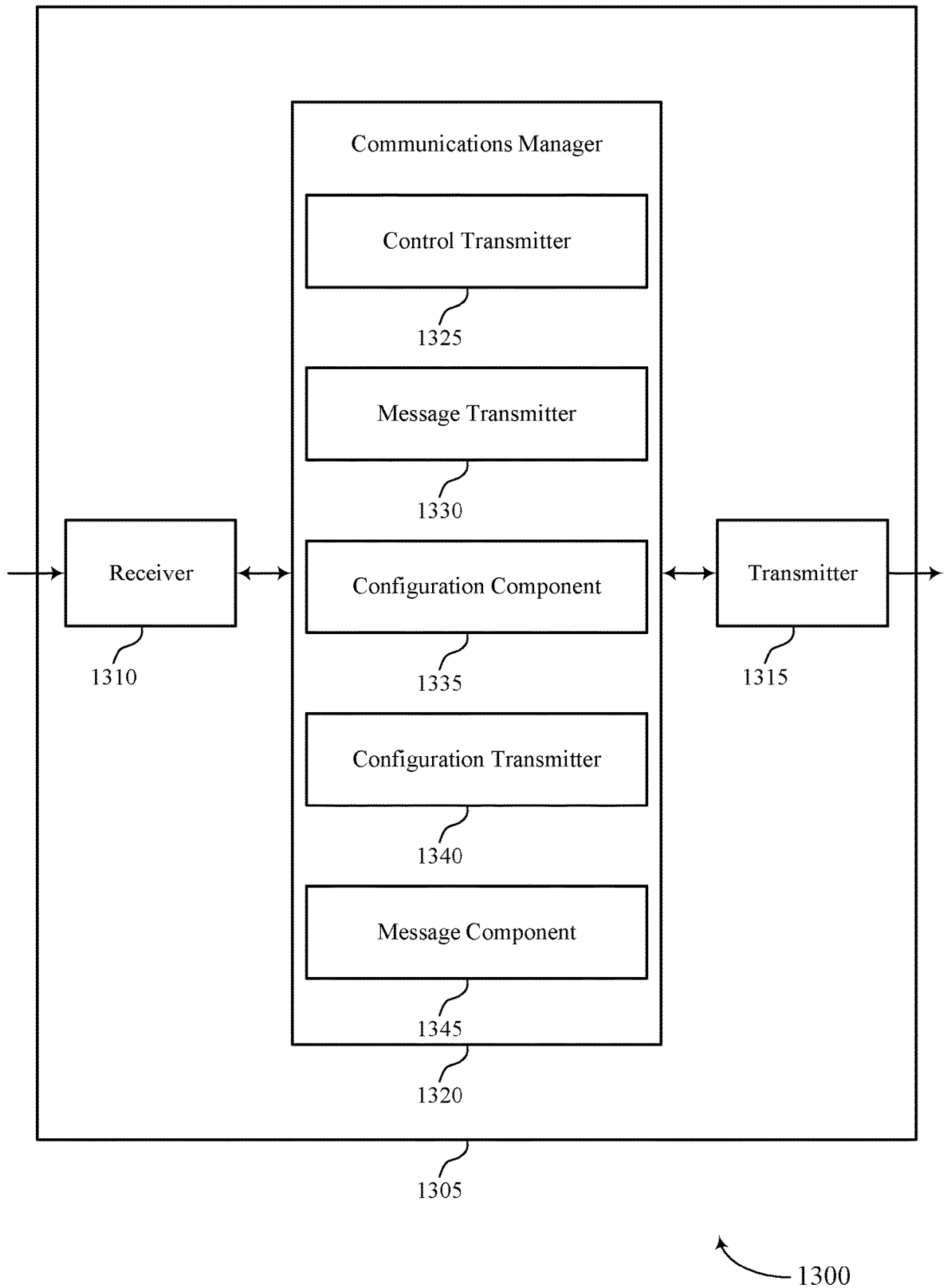

FIG. 13 shows a block diagram 1300 of a device 1305 that supports techniques for downlink forwarding in wireless communications systems in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for downlink forwarding in wireless communications systems). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for downlink forwarding in wireless communications systems). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for downlink forwarding in wireless communications systems as described herein. For example, the communications manager 1320 may include a control transmitter 1325, a message transmitter 1330, a configuration component 1335, a configuration transmitter 1340, a message component 1345, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a first device in accordance with examples as disclosed herein. The control transmitter 1325 may be configured as or otherwise support a means for transmitting control signaling to a second device within a first time period, the control signaling indicating a configuration for forwarding messages to a third device based on the second device including a first repeater. The message transmitter 1330 may be configured as or otherwise support a means for transmitting a message to the second device within a second time period, the second time period associated with a same slot as the first time period.

Additionally or alternatively, the communications manager 1320 may support wireless communication at a first device in accordance with examples as disclosed herein. The configuration component 1335 may be configured as or otherwise support a means for determining a first configuration for forwarding messages to a third device and a second configuration for forwarding messages to a fourth device, the first configuration and the second configuration based on a number of devices in a wireless network. The configuration transmitter 1340 may be configured as or otherwise support a means for transmitting first control signaling to a second device indicating the first configuration for forwarding messages to the third device. The configuration transmitter 1340 may be configured as or otherwise support a means for transmitting second control signaling to the second device, the control signaling indicating the second configuration for forwarding messages to the third device. The message component 1345 may be configured as or otherwise support a means for transmitting a message to the second device.

Figure 14:
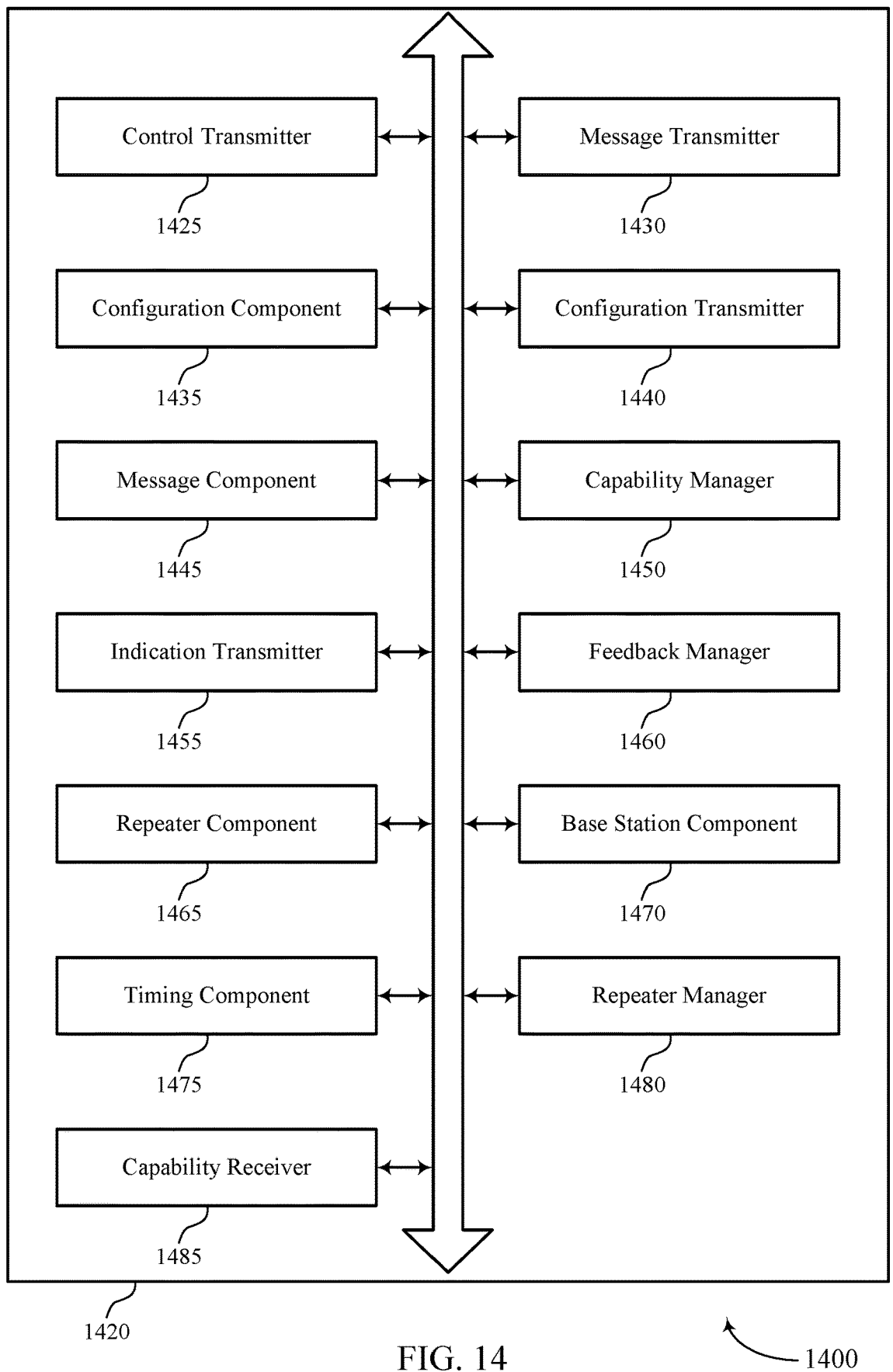
FIG. 14 shows a block diagram of a communications manager that supports techniques for downlink forwarding in wireless communications systems in accordance with aspects of the present disclosure.

FIG. 14 shows a block diagram 1400 of a communications manager 1420 that supports techniques for downlink forwarding in wireless communications systems in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of techniques for downlink forwarding in wireless communications systems as described herein. For example, the communications manager 1420 may include a control transmitter 1425, a message transmitter 1430, a configuration component 1435, a configuration transmitter 1440, a message component 1445, a capability manager 1450, an indication transmitter 1455, a feedback manager 1460, a repeater component 1465, a base station component 1470, a timing component 1475, a repeater manager 1480, a capability receiver 1485, or any combination thereof. Each of these components may communicate, directly or indirectly, with one another (e.g., via one or more buses).

The communications manager 1420 may support wireless communication at a first device in accordance with examples as disclosed herein. The control transmitter 1425 may be configured as or otherwise support a means for transmitting control signaling to a second device within a first time period, the control signaling indicating a configuration for forwarding messages to a third device based on the second device including a first repeater. The message transmitter 1430 may be configured as or otherwise support a means for transmitting a message to the second device within a second time period, the second time period associated with a same slot as the first time period.

In some examples, the control transmitter 1425 may be configured as or otherwise support a means for transmitting the control signaling includes transmitting the control signaling using a first BWP. In some examples, the message transmitter 1430 may be configured as or otherwise support a means for transmitting the message using a second BWP different from the first BWP. In some examples, the control transmitter 1425 may be configured as or otherwise support a means for transmitting an indication of the second BWP to the second device.

In some examples, the capability manager 1450 may be configured as or otherwise support a means for determining a buffering capability of the second device, where transmitting the message at the second time period is based on the buffering capability.

In some examples, the capability manager 1450 may be configured as or otherwise support a means for determining that the second device includes a digital repeater, where the buffering capability is based on the second device including the digital repeater.

In some examples, the capability receiver 1485 may be configured as or otherwise support a means for receiving, from the second device, an indication of a buffering capability of the second device, where transmitting the control signaling is in response to receiving the indication.

In some examples, the indication transmitter 1455 may be configured as or otherwise support a means for transmitting an indication that the second device is to buffer the message from the first device, where the control signaling includes the indication.

In some examples, the control transmitter 1425 may be configured as or otherwise support a means for transmitting second control signaling from the second device within a third time period, the second control signaling indicating a configuration for forwarding messages to a fourth device based on the third device including a second repeater.

In some examples, the control transmitter 1425 may be configured as or otherwise support a means for transmitting a configuration for forwarding feedback messages to the first device, where the control signaling includes the configuration. In some examples, the feedback manager 1460 may be configured as or otherwise support a means for receiving a feedback message from the second device in response to transmitting the message to the second device.

In some examples, the control signaling includes a FH-PDCCH transmission. In some examples, the first device includes a repeater. In some examples, the first device includes a base station.

Additionally or alternatively, the communications manager 1420 may support wireless communication at a first device in accordance with examples as disclosed herein. The configuration component 1435 may be configured as or otherwise support a means for determining a first configuration for forwarding messages to a third device and a second configuration for forwarding messages to a fourth device, the first configuration and the second configuration based on a number of devices in a wireless network. The configuration transmitter 1440 may be configured as or otherwise support a means for transmitting first control signaling to a second device indicating the first configuration for forwarding messages to the third device. In some examples, the configuration transmitter 1440 may be configured as or otherwise support a means for transmitting second control signaling to the second device, the control signaling indicating the second configuration for forwarding messages to the third device. The message component 1445 may be configured as or otherwise support a means for transmitting a message to the second device.

In some examples, to support determining the first configuration and the second configuration, the timing component 1475 may be configured as or otherwise support a means for determining a set of timing parameters associated with forwarding messages to the third device and the fourth device based on the number of devices in the wireless network, where the first configuration and the second configuration include the set of timing parameters.

In some examples, the control signaling includes a FH-PDCCH transmission.

In some examples, the second device includes a first repeater. In some examples, the third device includes a second repeater.

Figure 15:
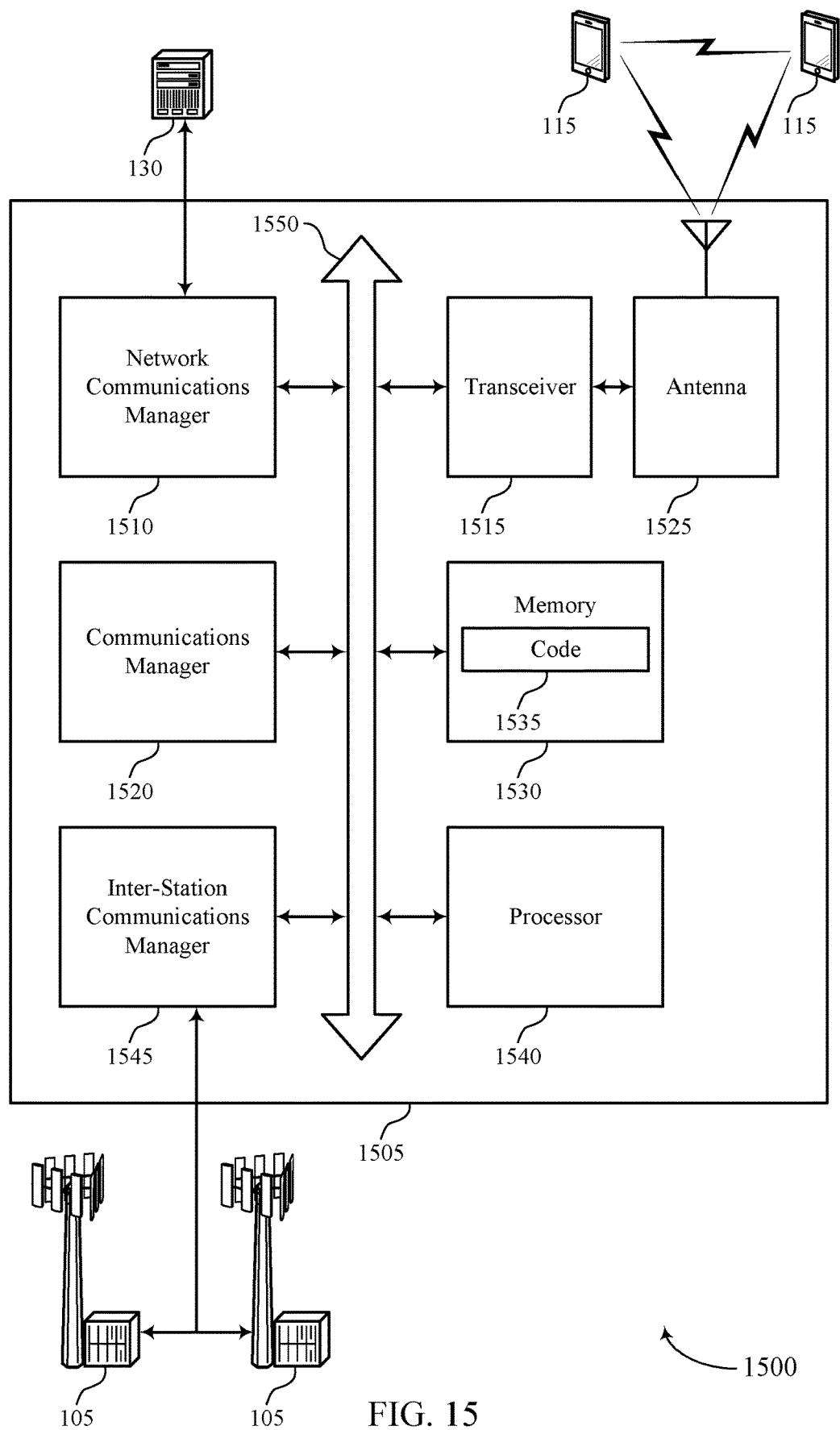
FIG. 15 shows a diagram of a system including a device that supports techniques for downlink forwarding in wireless communications systems in accordance with aspects of the present disclosure.

FIG. 15 shows a diagram of a system 1500 including a device 1505 that supports techniques for downlink forwarding in wireless communications systems in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for downlink forwarding in wireless communications systems). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a first device in accordance with examples as disclosed herein. For example, the communications manager 1520 may be configured as or otherwise support a means for transmitting control signaling to a second device within a first time period, the control signaling indicating a configuration for forwarding messages to a third device based on the second device including a first repeater. The communications manager 1520 may be configured as or otherwise support a means for transmitting a message to the second device within a second time period, the second time period associated with a same slot as the first time period.

Additionally or alternatively, the communications manager 1520 may support wireless communication at a first device in accordance with examples as disclosed herein. For example, the communications manager 1520 may be configured as or otherwise support a means for determining a first configuration for forwarding messages to a third device and a second configuration for forwarding messages to a fourth device, the first configuration and the second configuration based on a number of devices in a wireless network. The communications manager 1520 may be configured as or otherwise support a means for transmitting first control signaling to a second device indicating the first configuration for forwarding messages to the third device. The communications manager 1520 may be configured as or otherwise support a means for transmitting second control signaling to the second device, the control signaling indicating the second configuration for forwarding messages to the third device. The communications manager 1520 may be configured as or otherwise support a means for transmitting a message to the second device.

By including or configuring the communications manager 1520 in accordance with examples as described herein, the device 1505 may support techniques for downlink forwarding such that the device 1505 may exhibit a reduced power consumption, an increased efficiency of communications, an increased efficiency of resource utilization, a reduced latency, or a reduced signaling overhead, among other benefits.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for downlink forwarding in wireless communications systems as described herein, or the processor 1540 and the memory 1530 may be otherwise configured to perform or support such operations.

Figure 16:
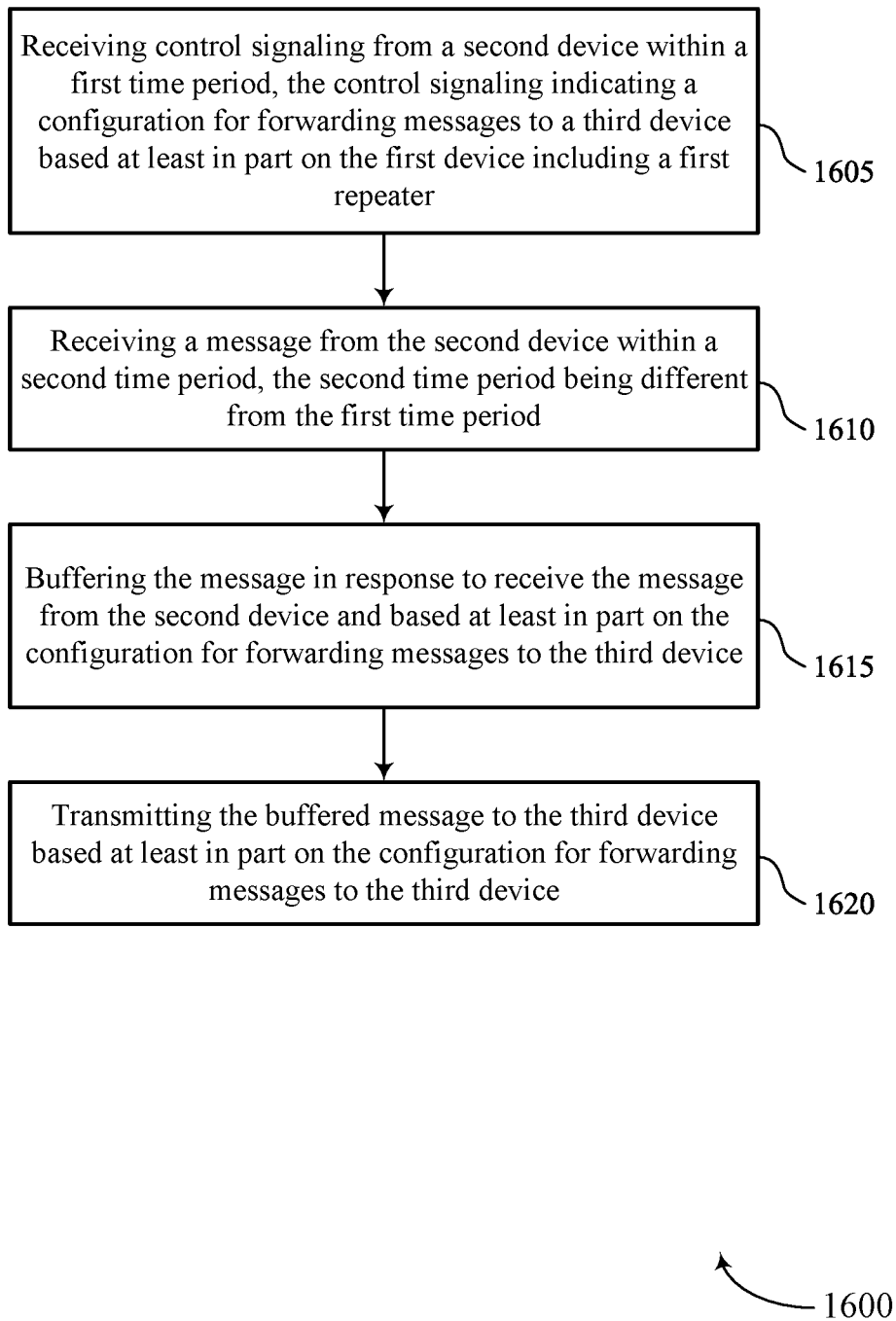
FIGS. 16 through 20 show flowcharts illustrating methods that support techniques for downlink forwarding in wireless communications systems in accordance with aspects of the present disclosure.

FIG. 16 shows a flowchart illustrating a method 1600 that supports techniques for downlink forwarding in wireless communications systems in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving control signaling from a second device within a first time period, the control signaling indicating a configuration for forwarding messages to a third device based on the first device including a first repeater. The operations of 1605 may be performed in accordance with examples as disclosed herein. In some examples, aspects of the operations of 1605 may be performed by a control receiver 1025 as described with reference to FIG. 10.

At 1610, the method may include receiving a message from the second device within a second time period, the second time period being different from the first time period. The operations of 1610 may be performed in accordance with examples as disclosed herein. In some examples, aspects of the operations of 1610 may be performed by a message receiver 1030 as described with reference to FIG. 10.

At 1615, the method may include buffering the message in response to receiving the message from the second device and based on the configuration for forwarding messages to the third device. The operations of 1615 may be performed in accordance with examples as disclosed herein. In some examples, aspects of the operations of 1615 may be performed by a buffer component 1035 as described with reference to FIG. 10.

At 1620, the method may include transmitting the buffered message to the third device based on the configuration for forwarding messages to the third device. The operations of 1620 may be performed in accordance with examples as disclosed herein. In some examples, aspects of the operations of 1620 may be performed by a buffer transmitter 1040 as described with reference to FIG. 10.

Figure 17:
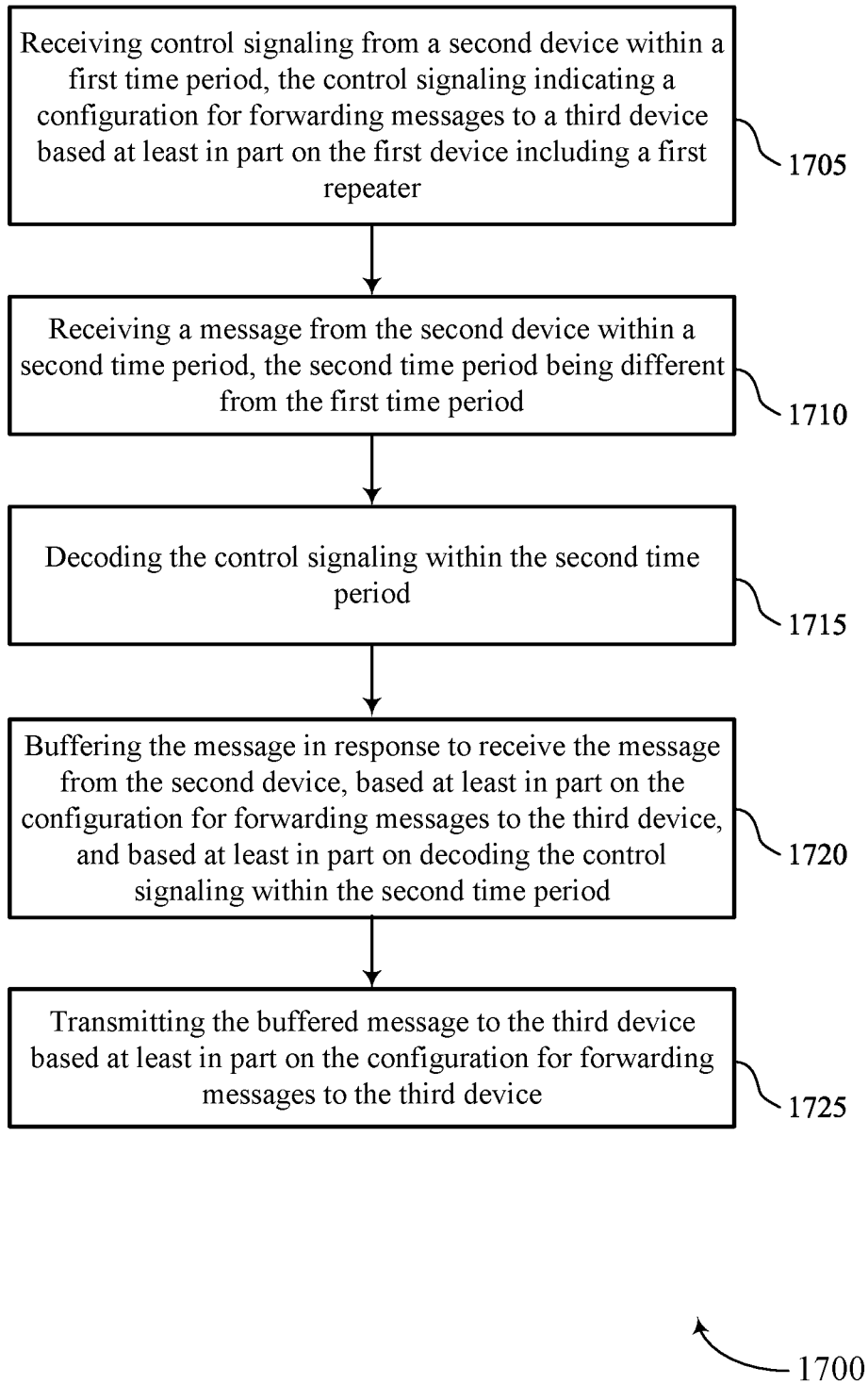

FIG. 17 shows a flowchart illustrating a method 1700 that supports techniques for downlink forwarding in wireless communications systems in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving control signaling from a second device within a first time period, the control signaling indicating a configuration for forwarding messages to a third device based on the first device including a first repeater. The operations of 1705 may be performed in accordance with examples as disclosed herein. In some examples, aspects of the operations of 1705 may be performed by a control receiver 1025 as described with reference to FIG. 10.

At 1710, the method may include receiving a message from the second device within a second time period, the second time period being different from the first time period. The operations of 1710 may be performed in accordance with examples as disclosed herein. In some examples, aspects of the operations of 1710 may be performed by a message receiver 1030 as described with reference to FIG. 10.

At 1715, the method may include decoding the control signaling within the second time period. The operations of 1715 may be performed in accordance with examples as disclosed herein. In some examples, aspects of the operations of 1715 may be performed by a control component 1055 as described with reference to FIG. 10.

At 1720, the method may include buffering the message in response to receiving the message from the second device, based on the configuration for forwarding messages to the third device, and based on decoding the control signaling within the second time period. The operations of 1720 may be performed in accordance with examples as disclosed herein. In some examples, aspects of the operations of 1720 may be performed by a buffer component 1035 as described with reference to FIG. 10.

At 1725, the method may include transmitting the buffered message to the third device based on the configuration for forwarding messages to the third device. The operations of 1725 may be performed in accordance with examples as disclosed herein. In some examples, aspects of the operations of 1725 may be performed by a buffer transmitter 1040 as described with reference to FIG. 10.

Figure 18:
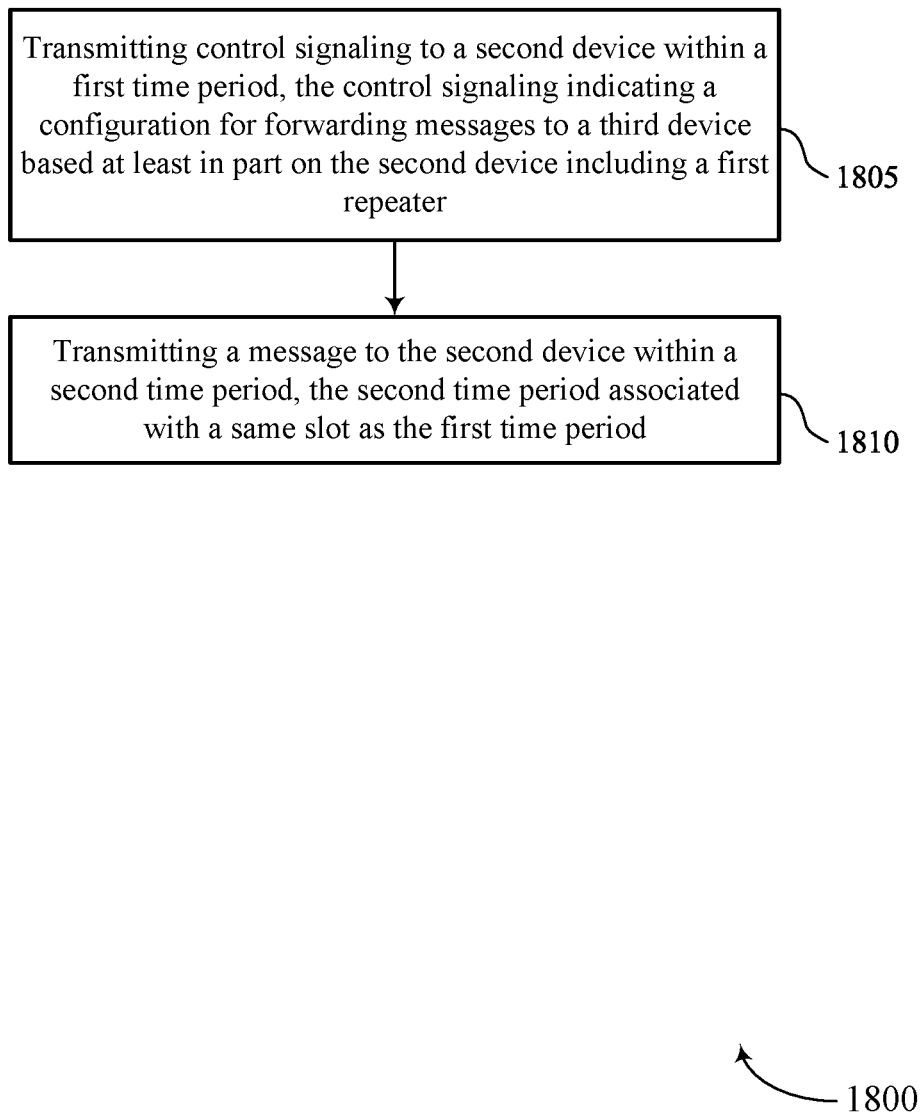

FIG. 18 shows a flowchart illustrating a method 1800 that supports techniques for downlink forwarding in wireless communications systems in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include transmitting control signaling to a second device within a first time period, the control signaling indicating a configuration for forwarding messages to a third device based on the second device including a first repeater. The operations of 1805 may be performed in accordance with examples as disclosed herein. In some examples, aspects of the operations of 1805 may be performed by a control transmitter 1425 as described with reference to FIG. 14.

At 1810, the method may include transmitting a message to the second device within a second time period, the second time period associated with a same slot as the first time period. The operations of 1810 may be performed in accordance with examples as disclosed herein. In some examples, aspects of the operations of 1810 may be performed by a message transmitter 1430 as described with reference to FIG. 14.

Figure 19:
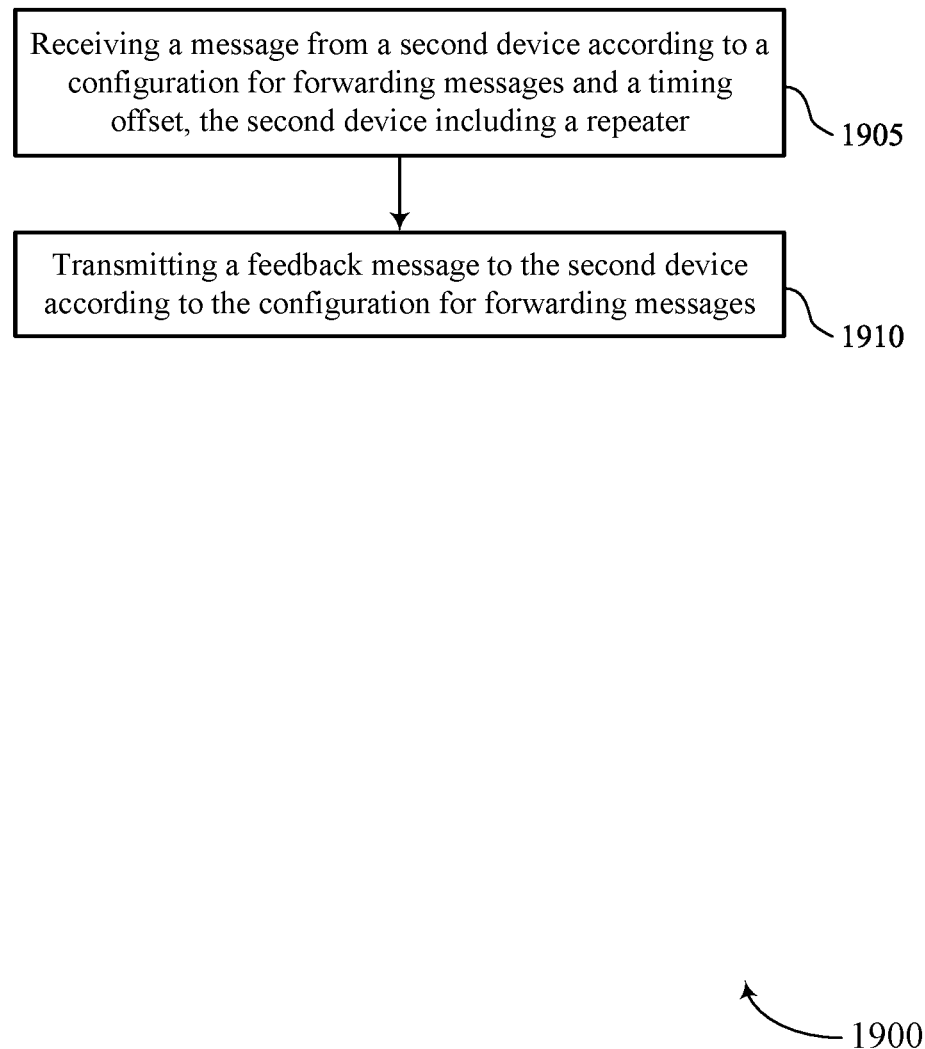

FIG. 19 shows a flowchart illustrating a method 1900 that supports techniques for downlink forwarding in wireless communications systems in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1905, the method may include receiving a message from a second device according to a configuration for forwarding messages and a timing offset, the second device including a repeater. The operations of 1905 may be performed in accordance with examples as disclosed herein. In some examples, aspects of the operations of 1905 may be performed by a message component 1045 as described with reference to FIG. 10.

At 1910, the method may include transmitting a feedback message to the second device according to the configuration for forwarding messages. The operations of 1910 may be performed in accordance with examples as disclosed herein. In some examples, aspects of the operations of 1910 may be performed by a feedback transmitter 1050 as described with reference to FIG. 10.

Figure 20:
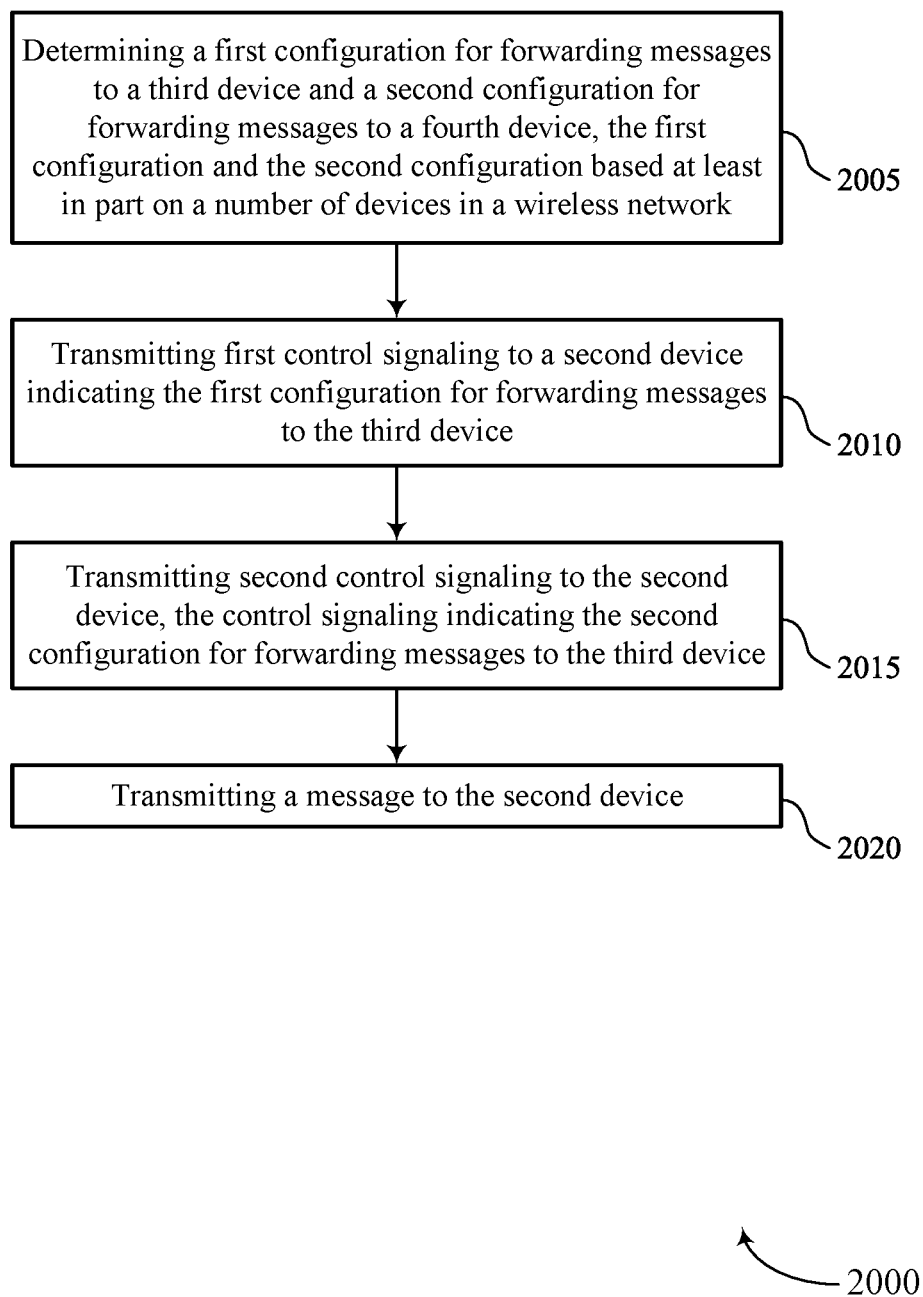

FIG. 20 shows a flowchart illustrating a method 2000 that supports techniques for downlink forwarding in wireless communications systems in accordance with aspects of the present disclosure. The operations of the method 2000 may be implemented by a base station or its components as described herein. For example, the operations of the method 2000 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2005, the method may include determining a first configuration for forwarding messages to a third device and a second configuration for forwarding messages to a fourth device, the first configuration and the second configuration based on a number of devices in a wireless network. The operations of 2005 may be performed in accordance with examples as disclosed herein. In some examples, aspects of the operations of 2005 may be performed by a configuration component 1435 as described with reference to FIG. 14.

At 2010, the method may include transmitting first control signaling to a second device indicating the first configuration for forwarding messages to the third device. The operations of 2010 may be performed in accordance with examples as disclosed herein. In some examples, aspects of the operations of 2010 may be performed by a configuration transmitter 1440 as described with reference to FIG. 14.

At 2015, the method may include transmitting second control signaling to the second device, the control signaling indicating the second configuration for forwarding messages to the third device. The operations of 2015 may be performed in accordance with examples as disclosed herein. In some examples, aspects of the operations of 2015 may be performed by a configuration transmitter 1440 as described with reference to FIG. 14.

At 2020, the method may include transmitting a message to the second device. The operations of 2020 may be performed in accordance with examples as disclosed herein. In some examples, aspects of the operations of 2020 may be performed by a message component 1445 as described with reference to FIG. 14.

The following provides an overview of aspects of the present disclosure:

Aspect 1: A method for wireless communication at a first device, comprising: receiving control signaling from a second device within a first time period, the control signaling indicating a configuration for forwarding messages to a third device based at least in part on the first device including a first repeater; receiving a message from the second device within a second time period, the second time period being different from the first time period; buffering the message in response to receiving the message from the second device and based at least in part on the configuration for forwarding messages to the third device; and transmitting the buffered message to the third device based at least in part on the configuration for forwarding messages to the third device.

Aspect 2: The method of aspect 1, further comprising: decoding the control signaling within the second time period, wherein buffering the message from the second device is based at least in part on the decoding.

Aspect 3: The method of any of aspects 1 through 2, further comprising: receiving the control signaling comprises receiving the control signaling using a first bandwidth part; and receiving the message from the second device comprises receiving the message using a second bandwidth part different from the first bandwidth part.

Aspect 4: The method of aspect 3, further comprising: receiving an indication of the second bandwidth part from the second device, wherein receiving the message using the second bandwidth part is based at least in part on receiving the indication of the second bandwidth part.

Aspect 5: The method of any of aspects 1 through 4, further comprising: determining a buffering capability of the first device, wherein receiving the message at the second time period is based at least in part on the buffering capability.

Aspect 6: The method of aspect 5, further comprising: determining that the first device includes a digital repeater, wherein the buffering capability is based at least in part on the first device including the digital repeater.

Aspect 7: The method of any of aspects 1 through 6, further comprising: transmitting, to the second device, an indication of a buffering capability of the first device, wherein receiving the control signaling is in response to transmitting the indication.

Aspect 8: The method of any of aspects 1 through 7, further comprising: receiving an indication that the first device is to buffer the message from the second device, wherein the control signaling comprises the indication.

Aspect 9: The method of any of aspects 1 through 8, further comprising: determining a set of digital samples associated with the message received from the second device, wherein buffering the message comprises buffering the set of digital samples.

Aspect 10: The method of any of aspects 1 through 9, further comprising: extracting the message from a buffer, wherein transmitting the buffered message to the third device is based at least in part on the extracting.

Aspect 11: The method of any of aspects 1 through 10, wherein the control signaling comprises first control signaling, the method further comprising: receiving second control signaling from the second device within a third time period, the second control signaling indicating a configuration for forwarding messages to a fourth device based at least in part on the third device including a second repeater; buffering the second control signaling in response to receiving the control signaling from the second device at the third time period; and transmitting the second control signaling to the third device.

Aspect 12: The method of any of aspects 1 through 11, further comprising: receiving a configuration for forwarding feedback messages to the second device, wherein the control signaling comprises the configuration; receiving a feedback message from the third device in response to transmitting the buffered message to the third device; and transmitting the feedback message to the second device.

Aspect 13: The method of any of aspects 1 through 12, wherein the first time period and the second time period are associated with a same slot; or a time offset between the first time period and the second time period is equal to zero.

Aspect 14: The method of any of aspects 1 through 13, wherein the control signaling comprises a FH-PDCCH transmission.

Aspect 15: A method for wireless communication at a first device, comprising: transmitting control signaling to a second device within a first time period, the control signaling indicating a configuration for forwarding messages to a third device based at least in part on the second device including a first repeater; transmitting a message to the second device within a second time period, the second time period associated with a same slot as the first time period.

Aspect 16: The method of aspect 15, further comprising: transmitting the control signaling comprises transmitting the control signaling using a first bandwidth part; and transmitting the message to the second device comprises transmitting the message using a second bandwidth part different from the first bandwidth part.

Aspect 17: The method of aspect 16, further comprising: transmitting an indication of the second bandwidth part to the second device, wherein transmitting the message using the second bandwidth part is based at least in part on transmitting the indication of the second bandwidth part.

Aspect 18: The method of any of aspects 15 through 17, further comprising: determining a buffering capability of the second device, wherein transmitting the message within the second time period is based at least in part on the buffering capability.

Aspect 19: The method of aspect 18, further comprising: determining that the second device includes a digital repeater, wherein the buffering capability is based at least in part on the second device including the digital repeater.

Aspect 20: The method of any of aspects 18 through 19, further comprising: receiving, from the second device, an indication of the buffering capability of the second device, wherein transmitting the control signaling is in response to receiving the indication.

Aspect 21: The method of any of aspects 15 through 20, further comprising: transmitting an indication that the second device is to buffer the message from the first device, wherein the control signaling comprises the indication.

Aspect 22: The method of any of aspects 15 through 21, further comprising: transmitting second control signaling to the second device within a third time period, the second control signaling indicating a configuration for forwarding messages to a fourth device based at least in part on the third device including a second repeater;

Aspect 23: The method of any of aspects 15 through 22, further comprising: transmitting a configuration for forwarding feedback messages to the first device, wherein the control signaling comprises the configuration; receiving a feedback message from the second device in response to transmitting the message to the second device.

Aspect 24: The method of any of aspects 15 through 23, wherein the control signaling comprises a FH-PDCCH transmission.

Aspect 25: The method of any of aspects 15 through 24, wherein the first device comprises a repeater; or the first device comprises a base station.

Aspect 26: A method for wireless communication at a first device, comprising: receiving a message from a second device according to a configuration for forwarding messages and a timing offset, the second device including a repeater, wherein the timing offset is based at least in part on a buffering capability of the second device; transmitting a feedback message to the second device according to the configuration for forwarding messages.

Aspect 27: A method for wireless communication at a first device, comprising: determining a first configuration for forwarding messages to a third device and a second configuration for forwarding messages to a fourth device, the first configuration and the second configuration based at least in part on a number of devices in a wireless network; transmitting first control signaling to a second device indicating the first configuration for forwarding messages to the third device; transmitting second control signaling to the second device, the control signaling indicating the second configuration for forwarding messages to the third device; and transmitting a message to the second device.

Aspect 28: The method of aspect 27, wherein determining the first configuration and the second configuration comprises: determining a set of timing parameters associated with forwarding messages to the third device and the fourth device based at least in part on the number of devices in the wireless network, wherein the first configuration and the second configuration comprise the set of timing parameters.

Aspect 29: The method of any of aspects 27 through 28, wherein the control signaling comprises a FH-PDCCH transmission.

Aspect 30: The method of any of aspects 27 through 29, wherein the second device comprises a first repeater; and the third device comprises a second repeater.

Aspect 31: An apparatus for wireless communication at a first device, comprising a processor; memory coupled with the processor; and instructions stored in the memory and executable by the processor to cause the apparatus to perform a method of any of aspects 1 through 14.

Aspect 32: An apparatus for wireless communication at a first device, comprising at least one means for performing a method of any of aspects 1 through 14.

Aspect 33: A non-transitory computer-readable medium storing code for wireless communication at a first device, the code comprising instructions executable by a processor to perform a method of any of aspects 1 through 14.

Aspect 34: An apparatus for wireless communication at a first device, comprising a processor; memory coupled with the processor; and instructions stored in the memory and executable by the processor to cause the apparatus to perform a method of any of aspects 15 through 25.

Aspect 35: An apparatus for wireless communication at a first device, comprising at least one means for performing a method of any of aspects 15 through 25.

Aspect 36: A non-transitory computer-readable medium storing code for wireless communication at a first device, the code comprising instructions executable by a processor to perform a method of any of aspects 15 through 25.

Aspect 37: An apparatus for wireless communication at a first device, comprising a processor; memory coupled with the processor; and instructions stored in the memory and executable by the processor to cause the apparatus to perform a method of any of aspects 26 through 26.

Aspect 38: An apparatus for wireless communication at a first device, comprising at least one means for performing a method of any of aspects 26 through 26.

Aspect 39: A non-transitory computer-readable medium storing code for wireless communication at a first device, the code comprising instructions executable by a processor to perform a method of any of aspects 26 through 26.

Aspect 40: An apparatus for wireless communication at a first device, comprising a processor; memory coupled with the processor; and instructions stored in the memory and executable by the processor to cause the apparatus to perform a method of any of aspects 27 through 30.

Aspect 41: An apparatus for wireless communication at a first device, comprising at least one means for performing a method of any of aspects 27 through 30.

Aspect 42: A non-transitory computer-readable medium storing code for wireless communication at a first device, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   receiving control signaling from a second device within a first time period, the control signaling indicating a configuration for forwarding messages to a third device based at least in part on the first device including a first repeater;
   receiving, based at least in part on a buffer capability of the first device being including a digital repeater, a message from the second device within a second time period, the second time period being different from the first time period;
   buffering the message in response to receiving the message from the second device and based at least in part on the configuration for forwarding messages to the third device; and
   transmitting the buffered message to the third device based at least in part on the configuration for forwarding messages to the third device.

2. The method of claim 1, further comprising:
   decoding the control signaling within the second time period, wherein buffering the message from the second device is based at least in part on the decoding.

3. The method of claim 1, further comprising:
   receiving the control signaling comprises receiving the control signaling using a first bandwidth part; and
   receiving the message from the second device comprises receiving the message using a second bandwidth part different from the first bandwidth part.

4. The method of claim 3, further comprising:
   receiving an indication of the second bandwidth part from the second device, wherein receiving the message using the second bandwidth part is based at least in part on receiving the indication of the second bandwidth part.

5. The method of claim 1, further comprising:
transmitting, to the second device, an indication of a buffering capability of the first device, wherein receiving the control signaling is in response to transmitting the indication.

6. The method of claim 1, further comprising:
receiving an indication that the first device is to buffer the message from the second device, wherein the control signaling comprises the indication.

7. The method of claim 1, further comprising:
determining a set of digital samples associated with the message received from the second device, wherein buffering the message comprises buffering the set of digital samples.

8. The method of claim 1, further comprising:
extracting the message from a buffer, wherein transmitting the buffered message to the third device is based at least in part on the extracting.

9. The method of claim 1, wherein the control signaling comprises first control signaling, the method further comprising:
receiving second control signaling from the second device within a third time period, the second control signaling indicating a configuration for forwarding messages to a fourth device based at least in part on the third device including a second repeater;
buffering the second control signaling in response to receiving the control signaling from the second device at the third time period; and
transmitting the second control signaling to the third device.

10. The method of claim 1, further comprising:
receiving a configuration for forwarding feedback messages to the second device, wherein the control signaling comprises the configuration;
receiving a feedback message from the third device in response to transmitting the buffered message to the third device; and
transmitting the feedback message to the second device.

11. The method of claim 1, wherein:
the first time period and the second time period are associated with a same slot; or
a time offset between the first time period and the second time period is equal to zero.

12. The method of claim 1, wherein the control signaling comprises a front haul physical downlink control channel transmission.

13. A method for wireless communication at a first device, comprising:
transmitting control signaling to a second device within a first time period, the control signaling indicating a configuration for forwarding messages to a third device based at least in part on the second device including a first repeater;
transmitting, based at least in part on a buffering capability of the second device being including a digital repeater, a message to the second device within a second time period, the second time period associated with a same slot as the first time period.

14. The method of claim 13, further comprising:
transmitting the control signaling comprises transmitting the control signaling using a first bandwidth part; and
transmitting the message to the second device comprises transmitting the message using a second bandwidth part different from the first bandwidth part.

15. The method of claim 14, further comprising:
transmitting an indication of the second bandwidth part to the second device, wherein transmitting the message using the second bandwidth part is based at least in part on transmitting the indication of the second bandwidth part.

16. The method of claim 15, further comprising:
receiving, from the second device, an indication of the buffering capability of the second device, wherein transmitting the control signaling is in response to receiving the indication.

17. The method of claim 13, further comprising:
transmitting an indication that the second device is to buffer the message from the first device, wherein the control signaling comprises the indication.

18. The method of claim 13, further comprising:
transmitting second control signaling to the second device within a third time period, the second control signaling indicating a configuration for forwarding messages to a fourth device based at least in part on the third device including a second repeater.

19. The method of claim 13, further comprising:
transmitting a configuration for forwarding feedback messages to the first device, wherein the control signaling comprises the configuration;
receiving a feedback message from the second device in response to transmitting the message to the second device.

20. The method of claim 13, wherein the control signaling comprises a front haul physical downlink control channel transmission.

21. The method of claim 13, wherein:
the first device comprises a repeater; or
the first device comprises a base station.

22. A method for wireless communication at a first device, comprising:
determining a first configuration for forwarding messages to a third device and a second configuration for forwarding messages to a fourth device, the first configuration and the second configuration based at least in part on a number of devices in a wireless network;
transmitting first control signaling to a second device indicating the first configuration for forwarding messages to the third device;
transmitting second control signaling to the second device, the control signaling indicating the second configuration for forwarding messages to the third device; and
transmitting a message to the second device.

23. The method of claim 22, wherein determining the first configuration and the second configuration comprises:
determining a set of timing parameters associated with forwarding messages to the third device and the fourth device based at least in part on the number of devices in the wireless network, wherein the first configuration and the second configuration comprise the set of timing parameters.

24. The method of claim 22, wherein the control signaling comprises a front haul physical downlink control channel transmission.

25. The method of claim 22, wherein:
the second device comprises a first repeater; and
the third device comprises a second repeater.

* * * * *